United States Patent
Subbiah et al.

(10) Patent No.: US 10,666,499 B2
(45) Date of Patent: May 26, 2020

(54) FIBRE CHANNEL OVER ETHERNET (FCOE) PINNING SYSTEM

(71) Applicant: Dell Products L.P., Round Rock, TX (US)

(72) Inventors: Ramesh Kumar Subbiah, Tamil Nadu (IN); Vibin Varghese, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 39 days.

(21) Appl. No.: 16/138,626

(22) Filed: Sep. 21, 2018

(65) Prior Publication Data

US 2020/0099573 A1 Mar. 26, 2020

(51) Int. Cl.
| | |
|---|---|
| H04L 12/24 | (2006.01) |
| H04L 12/703 | (2013.01) |
| H04L 12/707 | (2013.01) |
| H04L 29/08 | (2006.01) |
| H04L 12/931 | (2013.01) |
| H04L 12/709 | (2013.01) |

(52) U.S. Cl.
CPC .......... *H04L 41/0654* (2013.01); *H04L 45/22* (2013.01); *H04L 45/245* (2013.01); *H04L 45/28* (2013.01); *H04L 49/357* (2013.01); *H04L 67/1097* (2013.01)

(58) Field of Classification Search
CPC ............... H04L 49/357; H04L 41/0654; H04L 67/1097; H04L 49/557; H04L 45/22; H04W 40/00
See application file for complete search history.

(56) References Cited

U.S. PATENT DOCUMENTS

| | | | | |
|---|---|---|---|---|
| 8,422,359 B2* | 4/2013 | Nakajima | ............. | H04L 49/357 370/217 |
| 2011/0176412 A1* | 7/2011 | Stine | .................. | H04L 41/0668 370/221 |
| 2011/0274114 A1* | 11/2011 | Dhar | ...................... | H04L 12/56 370/401 |
| 2013/0100809 A1* | 4/2013 | Gale | ..................... | H04L 41/082 370/235 |

(Continued)

OTHER PUBLICATIONS

White et al, "Build a Smarter Data Center with Juniper Networks QFabric", Redbooks, 2012 (Year: 2012).*

(Continued)

*Primary Examiner* — Omer S Mian
(74) *Attorney, Agent, or Firm* — Haynes and Boone, LLP

(57) ABSTRACT

An FCoE pinning system includes a first FSB that is coupled to an FCF device and that is coupled to a first FCoE node, and a second FSB that is coupled to the first FCF device, a second FCoE node, and the first FSB through an inter-chassis link (ICL). The second FSB receives, via the ICL, a first FCoE node synchronization notification that includes a first FCF device identifier for the first FCF device and associates a first FCoE node identifier included in the first FCoE node synchronization notification with the ICL. The second FSB provides an FCoE backup notification to the first FCF device to indicate that the second FSB provides a backup path for FCoE traffic. The second FSB provides a second FCoE node synchronization notification to the first FSB that indicates that the second FSB will provide the backup path for the FCoE traffic via the ICL.

17 Claims, 29 Drawing Sheets

(56) References Cited

U.S. PATENT DOCUMENTS

2018/0343197 A1* 11/2018 Obulisami ............ H04L 49/357

OTHER PUBLICATIONS

"Method and System for Mapping eNodes on Fibre Channel over Ethernet Initialization Protocol (FIP) Snooping Bridges to Normal nPorts for SAN management software", Ip.com Technical Database, 2013 (Year: 2013).*

Enhanced FIPS Snooping Bridge (E-FSB), Ip.com Technical Database, 2014 (Year: 2014).*

* cited by examiner

FIBRE CHANNEL OVER ETHERNET (FCOE) PINNING SYSTEM

CROSS REFERENCE TO RELATED APPLICATIONS

This application is related to U.S. Utility application Ser. No. 16/138,568, filed Sep. 21, 2018, the disclosure of which is incorporated herein by reference in its entirety.

BACKGROUND

The present disclosure relates generally to information handling systems, and more particularly to Fibre Channel over Ethernet (FCoE) auto-pinning and FCoE backup path pinning by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems provide a Fibre Channel (FC) Storage Area Network (SAN) for the storage of data. In such systems, an FC switch may be utilized to couple the FC storage devices to servers via a Fibre Channel over Ethernet (FCoE) Forwarder (FCF) that performs FC over Ethernet (FCoE)-to-FC protocol conversions on Ethernet communications sent from the servers to the FC storage devices, as well as FC-to-FCoE protocol conversions on FC communications sent from the FC storage devices to the servers. Such FCFs allow for servers that communicate via the Ethernet protocol to utilize FC SANs that communicate via the FC protocol. In some server/FCF configurations, multiple links may be provided between a server and an FCF, and those links may be aggregated using an aggregation protocol to provide an aggregated interface. For example, a port channel utilizing Virtual link Trunking (VLT), which is a link aggregation protocol available in devices provided by DELL® Inc. of Round Rock, Tex., United States, may be used to aggregate the links between FCFs and servers. To support FCoE along with an aggregation interface, a user may statically pin one of the ports in the aggregation interface for FCoE traffic per FC SAN by, for example, providing a command via a command line interface (CLI). In some implementations, the server may include a Converged Network Adapter (CNA) having four ports, with one port per FC SAN dedicated for Ethernet traffic, and only one port that is capable of being pinned for FCoE traffic per FC SAN. As such, using an aggregated interface, only two of the four ports on that CNA can be configured for FCoE traffic.

Similarly, one or more FCoE Initialization Protocol (FIP) snooping bridges (FSBs) may be provided between the server and the FCF, and may provide multiple links to the FCF that can be aggregated as an aggregated interface, as well as multiple links to the server device(s). The FSB may be dedicated to a particular SAN, but may be coupled to other FCFs of other SANs as well. However, in current implementations, only one of the ports in an aggregated interface to the FCF, which is provided for the SAN to which the FSB is dedicated, can be configured as an FCoE pinned port. Thus, when multiple links of an aggregated interface are provided between the server and the FSB (or between the FCF and the FSB), only one of those links may be pinned for FCoE traffic, which is inefficient as there is potential unused bandwidth on the additional links for that FCoE traffic.

Furthermore, when a link on a port that is pinned for FCoE traffic goes down, fails, or otherwise becomes unavailable, it must be backed up by a link provided by another member port connected to the same peer device. For example, when a link between an FSB and a FCF goes down, only another link provided between that FSB and that FCF may be used as a backup for the FCoE traffic that was being provided between the FSB and the FCF by the link that is no longer available. Thus, if there are no additional links being provided between the FSB and the FCF, there is no backup link available and a fabric login must occur to reestablish the link, even when there are other paths that are available between the FSB and the FCF.

Accordingly, it would be desirable to provide an improved FCoE pinning system with an FCoE backup path.

SUMMARY

According to one embodiment, an Information Handling System (IHS) includes a a plurality of ports; a processing system that is coupled to the plurality of ports; and a memory system that is coupled to the processing system and that includes instructions that, when executed by the processing system, cause the processing system to provide an Fibre Channel over Ethernet (FCoE) pinning engine that is configured to: receive, via a first port of the plurality of ports that provides an inter-chassis link (ICL), a first FCoE node synchronization notification that includes a first FCF device identifier for a first FCF device that indicates a first FCoE node is logged into a first FCoE fowarder (FCF) device through a first FCoE Initialization Protocol (FIP) Snooping Bridge (FSB); associate a first FCoE node identifier included in the first FCoE node synchronization notification with the ICL; provide an FCoE backup notification through a second port of the plurality of ports to the first FCF device, wherein the FCoE backup notification is configured to indicate to the first FCF device that the second port provides a backup path for FCoE traffic between the first FCoE node and the first FCF device; and provide a second FCoE node synchronization notification to the first FSB, wherein the second FCoE node synchronization notification is configured to indicate that the ICL will provide the backup path for the FCoE traffic between the first FCoE node and the first FCF.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
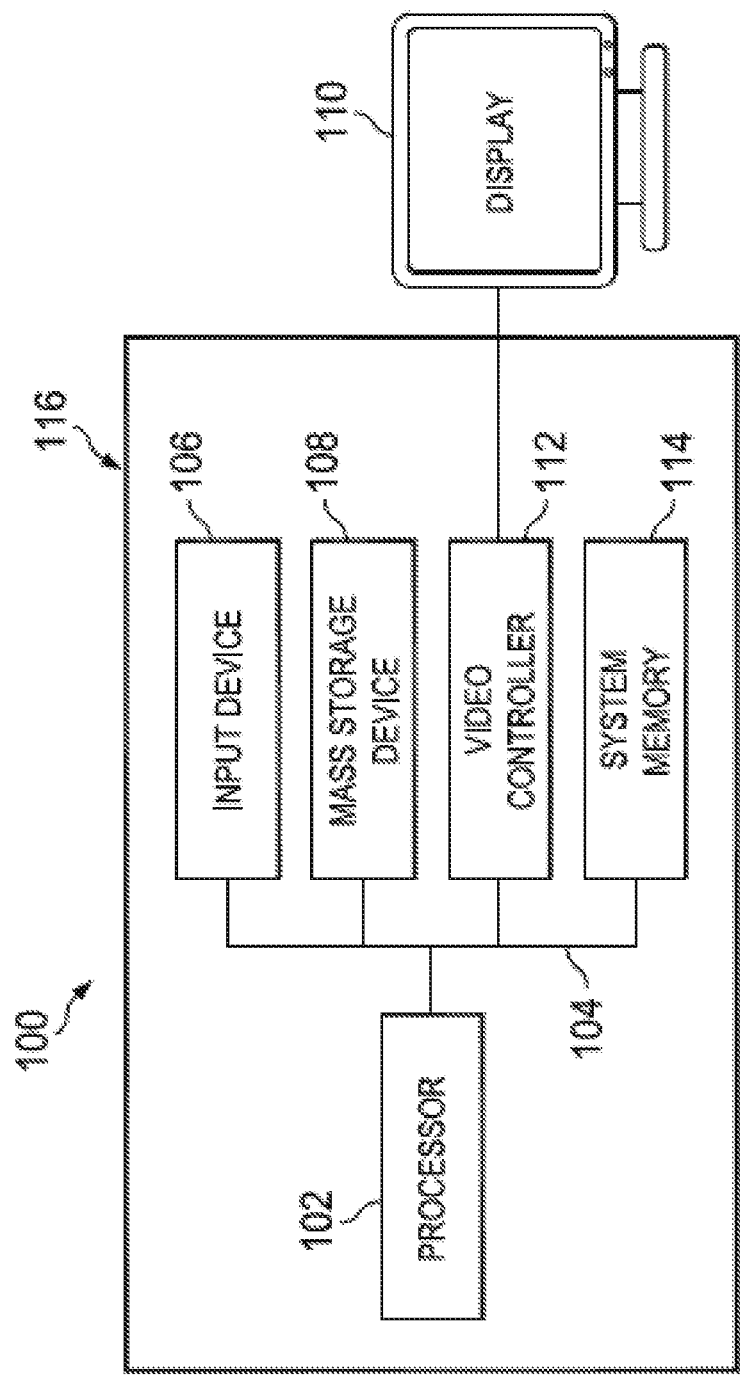
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102.

Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
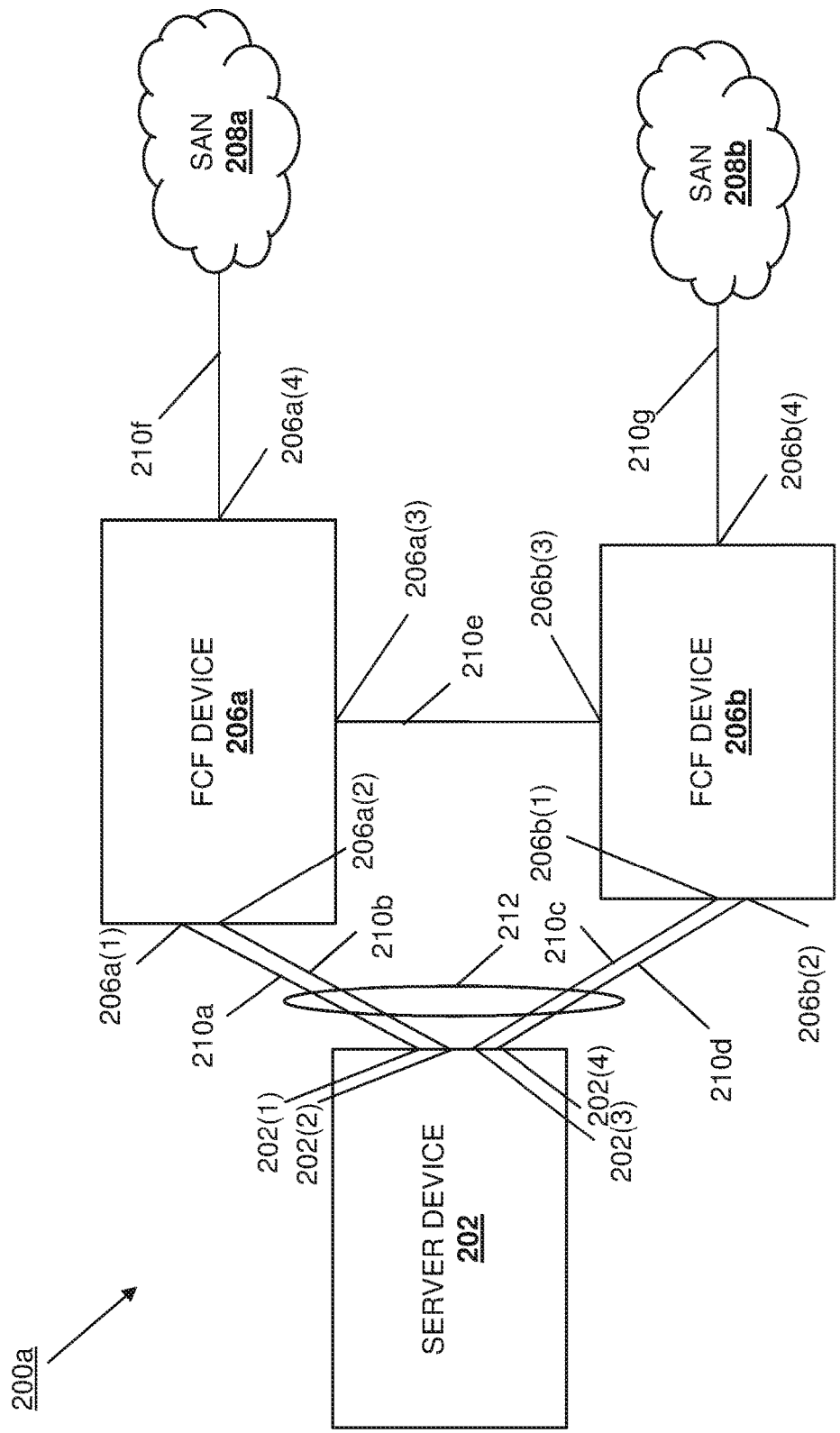
FIG. 2A is a schematic view illustrating an embodiment of a Fibre Channel over Ethernet (FCoE) pinning system.

Referring now to FIG. 2A, an embodiment of a Fibre Channel over Ethernet (FCoE) pinning system 200a is illustrated. In the illustrated embodiment, the FCoE pinning system 200 includes a server device 202 that may be the IHS 100 discussed above with reference to FIG. 1 and/or that may include some or all of the components of the IHS 100. For example, the server device 202 may be one or more servers in a server rack or server chassis, and one of skill in the art in possession of the present disclosure will recognize that any number of servers may be provided in the FCoE pinning system 200a and may operate similarly to the server devices discussed below. In the illustrated embodiment, the server device 202 is coupled to an FCoE Forwarder (FCF) device 206a that may be the IHS 100 discussed above with reference to FIG. 1 and/or that may include some or all of the components of the IHS 100. For example, the FCF device 206a may be provided by a switch or other networking device that is configured to receive Ethernet communications from the server device 202a, convert those Ethernet communications to Fibre Chanel (FC) communications for forwarding to an FC Storage Area Network (SAN), receive FC communications from the FC SAN, convert those FC communications to Ethernet communications for forwarding to the server device 202, and/or perform other FCF device functionality know in the art. One of skill in the art in possession of the present disclosure will recognize that any number of FCF devices, such as the FCF device 206b illustrated in FIG. 2A, may be provided in the FCoE pinning system 200a and operate similarly to the FCF device 206a.

In the illustrated embodiment, the FCF device 206a is coupled to an FC switch, an FC storage system, and/or any other FC networking device that may be included in an SAN 208a. For example, the FC SAN 208a may be configured to receive communications from the server device 202 that were converted as discussed above by the FCF device 206a, send communications to the server device that are converted as discussed above by the FCF device 206a, and/or perform a variety of other FC networking and storage system functionality that would be apparent to one of skill in the art in possession of the present disclosure. In various embodiments, the FCF device 206a may be coupled to a local area network (LAN) in order to send and receive Ethernet traffic via the LAN. In various embodiments, the FCF device 206a is included in a first virtual local area network for the SAN 208a.

In the illustrated embodiment, the FCF device 206b is coupled to an FC switch, an FC storage system, and/or any other FC networking device that may be included in an SAN 208b. For example, the FC SAN 208b may be configured to receive communications from the server device 202 that were converted as discussed above by the FCF device 206b, send communications to the server device that are converted as discussed above by the FCF device 206b, and/or perform a variety of other FC networking and storage system functionality that would be apparent to one of skill in the art in possession of the present disclosure. In various embodiments, the FCF device 206a may be coupled to a local area network (LAN) in order to send and receive Ethernet traffic via the LAN. In various embodiments, the FCF device 206b is included in a second virtual local area network for the SAN 208b. One of skill in the art in possession of the present disclosure will recognize that the FCF device 206a and the FCF device 206b may be coupled to the same upstream target device (e.g., an FC switch, an FC storage device, etc.) but belong to different SANs.

In the illustrated embodiment, the server device 202 may be connected with the FCF device 206a by a link 210a between a server port 202(1) and an FCF device port 206a(1), and by a link 210b between a server port 202(2) and an FCF device port 206a(2). Similarly, the server device 202 may be connected with the FCF device 206b by a link 210c between a server port 202(3) and an FCF device port 206b(1), and by a link 210d between a server port 202(4) and an FCF device port 206b(2). The links 210a-210d may be aggregated (e.g., via a port channel (also referred to as a VLT Link Aggregation Group (LAG) in VLT systems)) to provide an aggregated interface 212. The FCF device 206a may be connected to the FCF device 206b by a link 210e between an FCF device port 206a(3) and an FCF device port 206b(3). The link 210e may be an Inter-Chassis link (ICL) (also called a VLT interface (VLTi) in VLT systems) that may include a plurality of aggregated links. In the illustrated embodiment, the FCF device 206a may be connected to the FC SAN 208a by a link 210f through an FCF device port 206a(4), and the FCF device 206b may be connected to the FC SAN 208b by a link 210g through an FCF device port 206b(4). As would be understood by one of skill in the art in possession of the present disclosure, VLT is a proprietary aggregation protocol utilized by devices provided by DELL®, Inc. of Round Rock, Tex., United States, in order to allow an aggregated link with two different devices, although other aggregation protocols may benefit from the teachings of the present disclosure and thus are envisioned as falling within its scope as well.

Figure 2B:
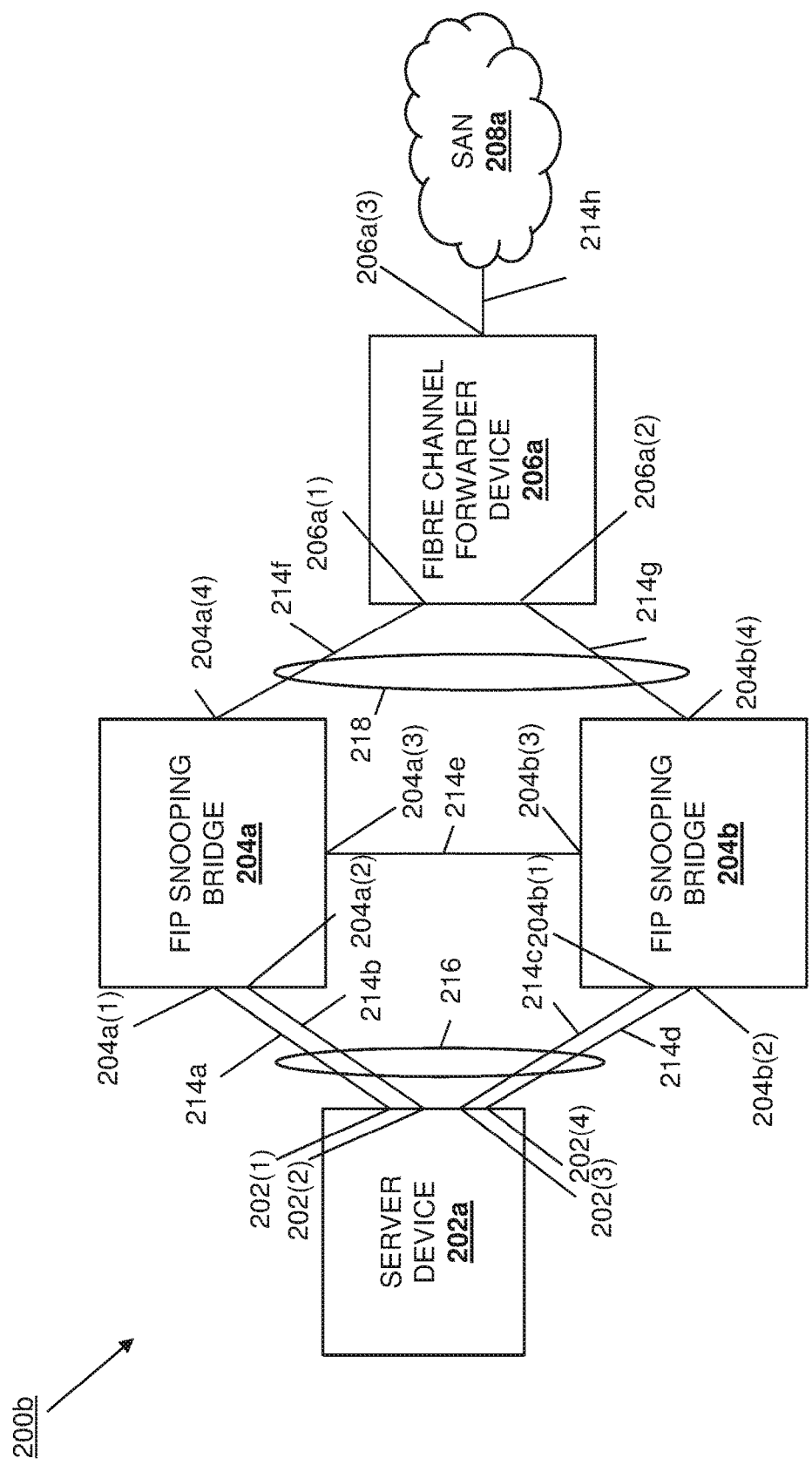
FIG. 2B is a schematic view illustrating an embodiment of an FCoE pinning system.

Referring now to FIG. 2B, an embodiment of an FCoE pinning system 200b is illustrated that may include the server device 202, the FCF device 206a, and the FC SAN 208a of the FCoE pinning system 200a described above with reference to FIG. 2A. In the illustrated embodiment, the server device 202 and the FCF device 206a are coupled to an FCoE Initialization Protocol (FIP) Snooping Bridge (FSB) 204a that may be the IHS 100 discussed above with reference to FIG. 1 and/or that may include some or all of the components of the IHS 100. For example, the FSB 204a may be provided by a switch or other networking device that is configured to snoop on FIP packets during the discovery and login phases of end nodes in order to, for example, implement data integrity mechanisms using access control lists (ACLs) that permit valid FCoE traffic between an ENode and the FCF device 206a, as well as other FSB functionality that would be apparent to one of skill in the art in possession of the present disclosure. One of skill in the art in possession of the present disclosure will recognize that any number of FSBs, such as the FSB 204b illustrated in FIG. 2B, may be provided in the FCoE pinning system 200b and may operate similarly to the FSB 204a. As discussed below, the server device 202a may include a four port Converged Network Adapter (CNA), with each port being an FCoE node (ENode).

In the illustrated embodiment, a first SAN/VLAN may include the server device 202, the FCF device 206a, and the FSB 204a. The server device 202 may be connected with the FSB 204a by a link 214a between a server port 202(1) and an FSB port 204a(1), and by a link 214b between a server port 202(2) and an FSB port 204a(2). A second SAN/VLAN may include the server device 202, the FCF device 206a, and the FSB 204b. The server device 202 may be connected with the FSB 204b by a link 214c between a server port 202(3) and an FSB port 204b(1), and by a link 214d between a server port 202(4) and an FSB port 204b(2). The links 214a-214d may be aggregated (e.g., using a port channel) to provide an aggregated interface 216. The FSB 204a may be connected to the FSB 204b by a link 214e between an FSB port 204a(3) and an FSB port 204b(3). The link 214e may be an ICL (e.g., a VLTi in VLT systems) that may include a plurality of aggregated links. In the illustrated embodiment, the FSB 204a may be connected to the FCF device 206a by a link 214f between an FSB port 204a(4) and the FCF device port 206a(1). The FSB 204b may be connected to the FCF device 206a by a link 214g between an FSB port 204b(4) and the FCF device port 206b(1). The links 214f and 214g may be aggregated to provide an aggregated interface 218. The FCF device 206a may be connected to the FC SAN 208a by a link 214h through the FCF device port 206a(3).

While the aggregated interface 216 in the FCoE pinning system 200b is illustrated as having four links between the server device 202 and the FSBs 204a and 204b, one of skill in the art in possession of the present disclosure would recognize that the aggregated interface 216 may include more or fewer links. For example, and with reference to FIG. 2C, an FCoE pinning system 200c is illustrated that is substantially similar to the FCoE pinning system 200b of FIG. 2B, but with the aggregated interface 216 including only two links: the link 214a between the server port 202(1) and the FSB port 204a(1), and the link 214d between the server port 202(4) and the FSB port 204b(2).

Similarly, while the aggregated interface 218 includes links 214f and 214g, one of skill in the art in possession of the present disclosure would recognize that there may be additional links between the FSB 204a and the FCF device 206a, and/or between the FSB 204b and the FCF device 206a. For example and referring now to FIG. 2D, an FCoE pinning system 200d is illustrated where the FSB 204a, the FSB 204b, the FCF device 206a, and the FCF device 206b are configured in a square topology. In the illustrated embodiment, a first SAN/VLAN may include the server device 202, the FCF device 206a, and the FSB 204a, and a second SAN/VLAN may include the server device 202, the FCF device 206b, and the FSB 204b. The server device 202 may be connected with the FSB 204a by the link 214a between the server port 202(1) and the FSB port 204a(1). The server device 202 may be connected with the FSB 204b by the link 214d between a server port 202(4) and an FSB port 204b(2). The links 214a and 214d may be aggregated to provide the aggregated interface 216. The FSB 204a may be connected to the FSB 204b by a link 214e between an FSB port 204a(3) and an FSB port 204b(3). The link 214e may be an ICL and may include a plurality of aggregated links.

In the illustrated embodiment, the FSB 204a may be connected to the FCF device 206a by the link 214f between the FSB port 204a(4) and the FCF device port 206a(1). The FSB 204a may also be connected to the FCF device 206a by a link 214g between the FSB port 204a(5) and the FCF device port 206a(2). The FSB 204a may be connected to the FCF device 206b by a link 214h between an FSB port 204a(6) and the FCF device port 206b(1). The FSB 204b may be connected to the FCF device 206a by a link 214i between the FSB port 204b(4) and the FCF device port 206a(3). The FSB 204b may be connected to the FCF device 206b by a link 214j between the FSB port 204b(5) and the FCF device port 206b(2). The links 214f-214j may be aggregated to provide the aggregated interface 218. The FCF device 206a may be connected to the FCF device 206b by a link 214l between the FCF device port 206a(4) and the FCF device port 206b(3). The link 214l may be an ICL and may include a plurality of aggregated links. The FCF device 206a may be connected to the FC SAN 208a by a link 214m through an FCF device port 206a(5). The FCF device 206b may be connected to the FC SAN 208a by a link 214n through an FCF device port 206b(4). While specific FCoE pinning systems 200a-200d have been illustrated and described, one of skill in the art in possession of the present disclosure will recognize that the teachings of the present disclosure will be beneficial for a variety of FCoE pinning systems that would be apparent to one of skill in the art in possession of the present disclosure and, as such, a wide variety of modifications to the number, types, and orientation of devices in the FCoE pinning systems 200a-200d will fall within the scope of the present disclosure as well.

Figure 2C:
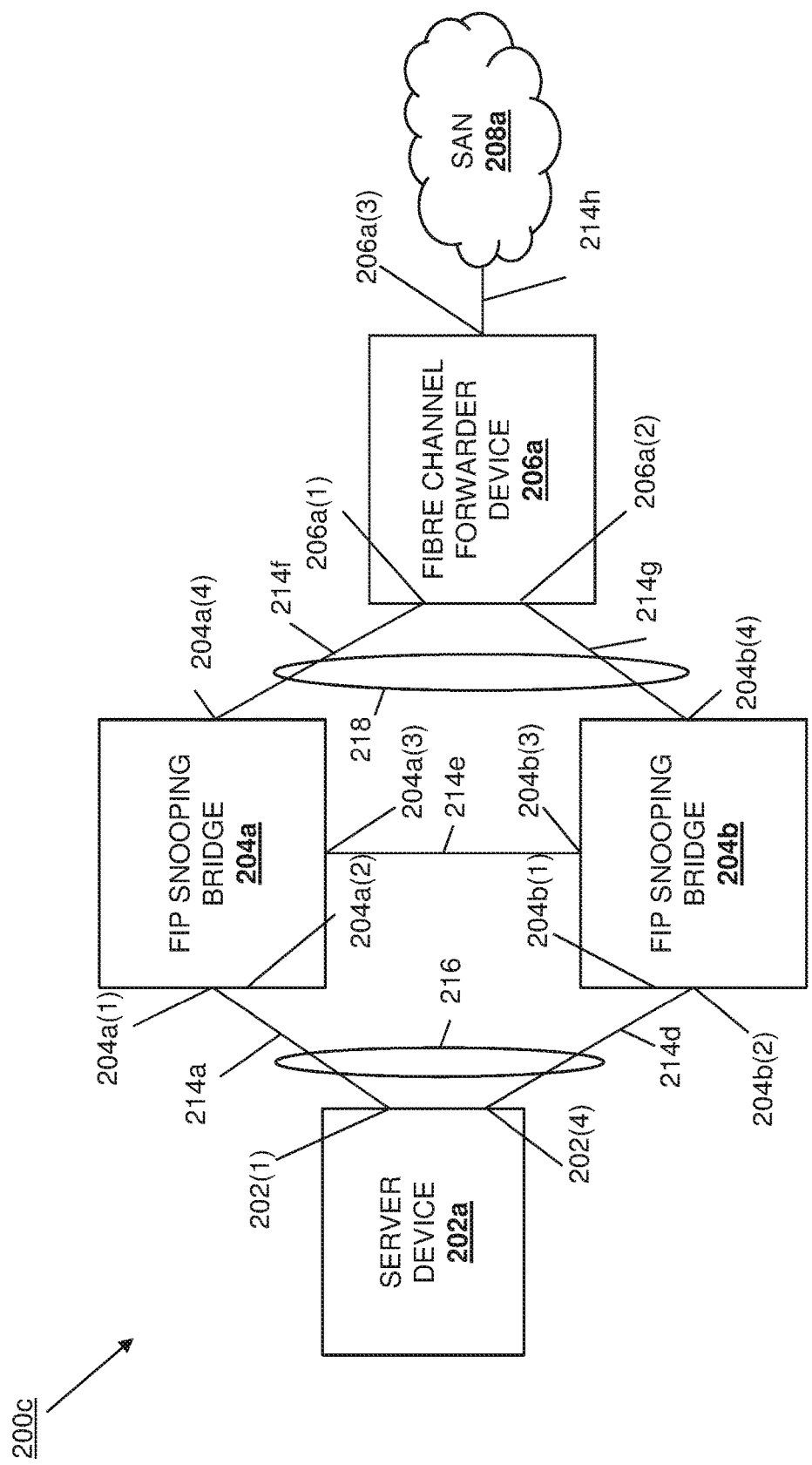
FIG. 2C is a schematic view illustrating an embodiment of an FCoE pinning system.
Figure 2D:
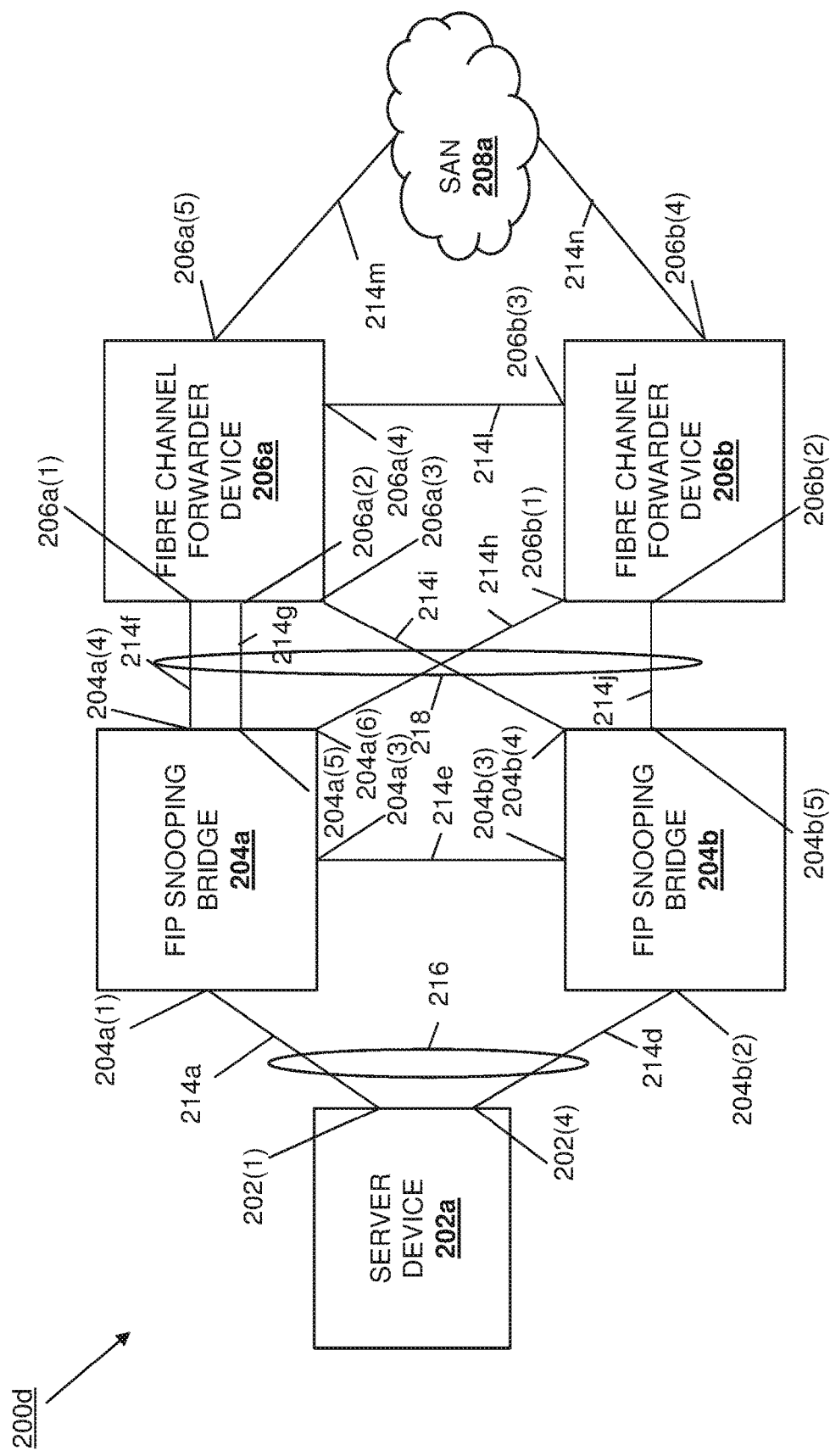
FIG. 2D is a schematic view illustrating an embodiment of an FCoE pinning system.
Figure 3:
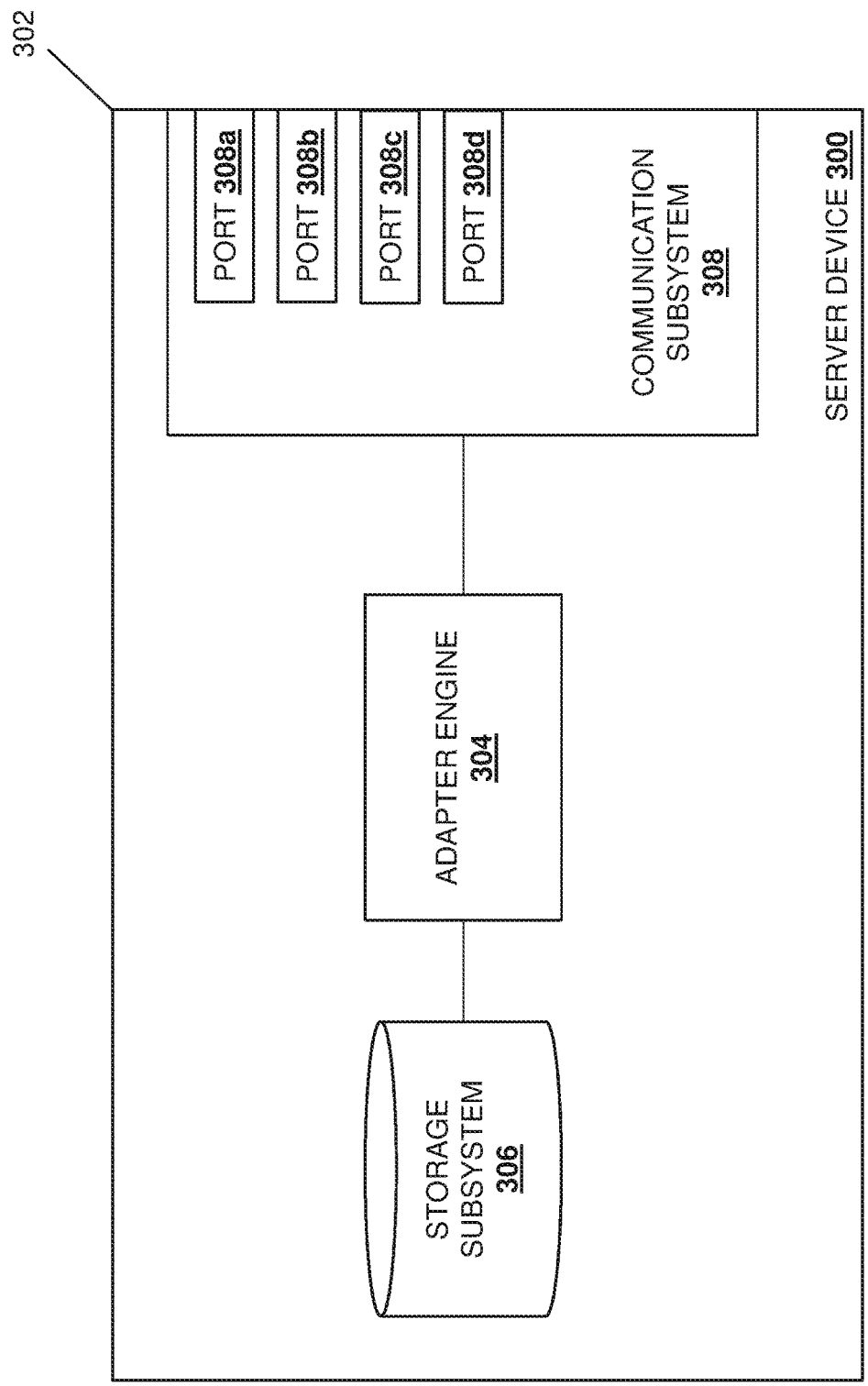
FIG. 3 is a schematic view illustrating an embodiment of a server device in the FCoE pinning systems of FIGS. 2A-2D.

Referring now to FIG. 3, an embodiment of a server device 300 is illustrated that may be the server device 202 discussed above with reference to FIGS. 2A-2D. As such, the server device 300 may be the IHS 100 discussed above with reference to FIG. 1 and/or may include some or all of the components of the IHS 100, and in specific examples may be one or more servers in a server rack or server chassis. In the illustrated embodiment, the server device 300 includes a chassis 302 that houses the components of the server device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an adapter engine 304 that is configured to perform the functions of the adapter engines and server devices discussed below.

The chassis 302 may also house a storage system (not illustrated, but which may include the storage device 108 discussed above with reference to FIG. 1) that is coupled to the adapter engine 304 (e.g., via a coupling between the storage system and the processing system) and that may include a storage subsystem 306 that is configured to store the data utilized as discussed below. However, in some embodiments the storage subsystem 306 may be omitted. The chassis 302 may also house a communication subsystem 308 that is coupled to the adapter engine 304 (e.g., via a coupling between the communication subsystem 308 and the processing system) and that may include a Network Interface Controller (NIC), a wireless communication devices, one or more ports (e.g., a port 308a), and/or other communication components that would be apparent to one of skill in the art in possession of the present disclosure. Furthermore, in some embodiments, components of the adapter engine 304 and/or the communication subsystem 308 may be provided by a Converged Network Adapter (CNA) that performs the functionality of the adapter engines and/or server devices discussed below. In various embodiments, the CNA may be a four port CNA that includes a port 308a, a port 308b, a port 308c, and a port 308d, which may be the ports 202a-202d discussed above with reference to FIGS. 2A-2D. However, in other embodiments, the adapter engine 304 and/or communication subsystem 308 may be utilized to provide any number of ports and other types of adapters (e.g., Host Bus Adapters (HBAs)) while remaining within the scope of the present disclosure. While a specific server device 300 has been described, one of skill in the art in possession of the present disclosure will recognize that the server device 300 may include a variety of other components that perform conventional server device functionality, as well as the functionality described below, while remaining within the scope of the present disclosure.

Figure 4:
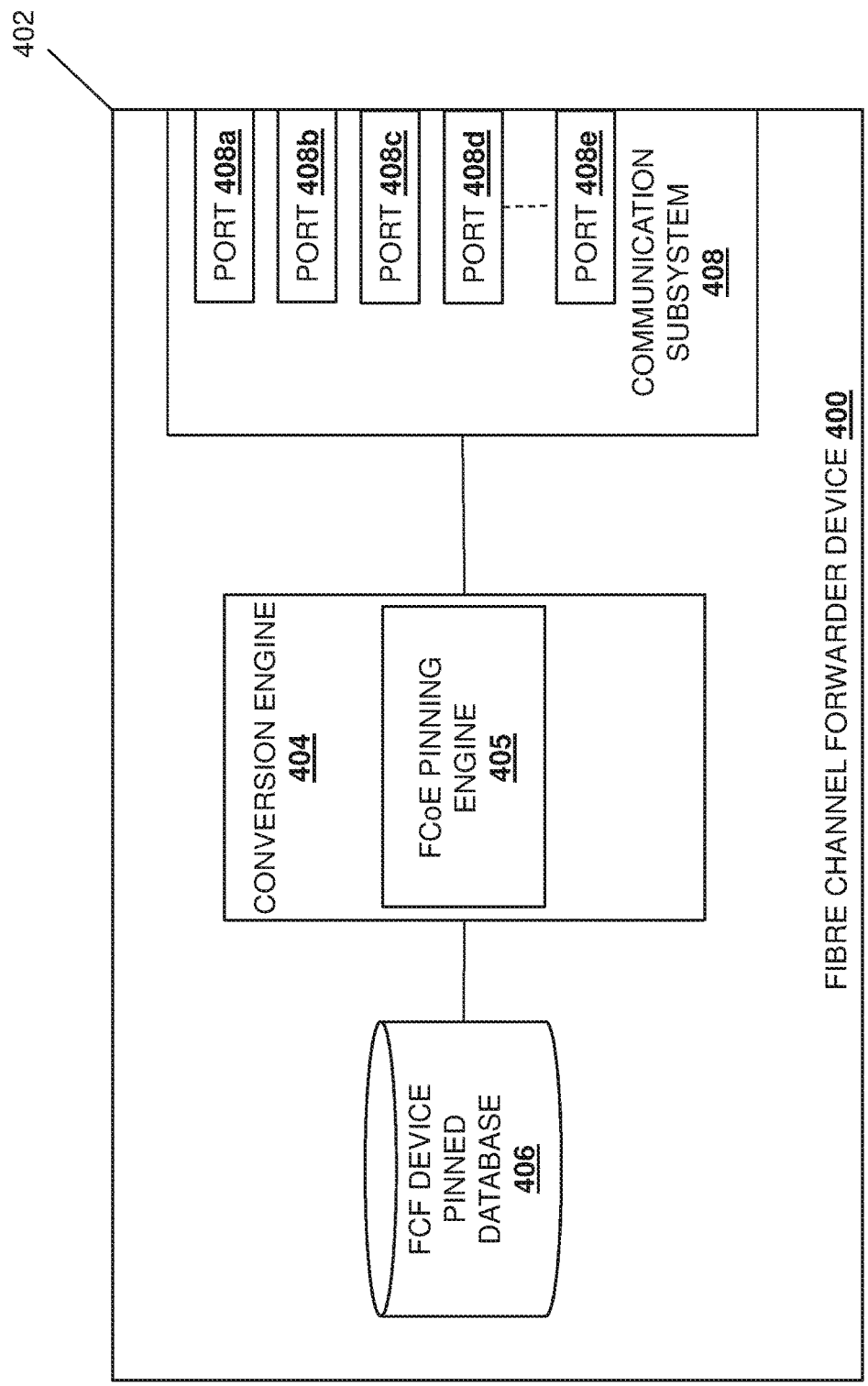
FIG. 4 is a schematic view illustrating an embodiment of an FCF device in the FCoE pinning systems of FIGS. 2A-2D.

Referring now to FIG. 4, an embodiment of a Fibre Channel over Ethernet (FCoE) Forwarder (FCF) device 400 is illustrated that may be the FCF devices 206a and 206b discussed above with reference to FIGS. 2A-2D. As such, the FCF device 400 may be the IHS 100 discussed above with reference to FIG. 1 and/or may include some or all of the components of the IHS 100, and in specific examples may be a switch, a gateway, or other networking device. In the illustrated embodiment, the FCF device 400 includes a chassis 402 that houses the components of the FCF device 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a conversion engine 404 that is configured to perform the functions of the conversion engines and FCF devices discussed below. In a specific example, the conversion engine 404 may include an N_Port ID Virtualization (NPIV) Proxy Gateway (NPG) engine that operates as discussed below, although other conversion engines may fall within the scope of the present disclosure as well. In another example, the conversion engine 404 may include an FCoE pinning engine 405 that is configured to perform the functions of the FCoE pinning engines and FCF devices discussed below such as, for example, pinning one or more ports that are included in a port interface/aggregated interface for FCoE traffic, as discussed in detail below.

The chassis 402 may also house a storage system (not illustrated, but which may include the storage device 108 discussed above with reference to FIG. 1) that is coupled to the conversion engine 404 (e.g., via a coupling between the storage system and the processing system) and that may include an FCF device pinned database 406 that is configured to store the data utilized by the configuration engine 404 as discussed below. The chassis 402 may also house a communication subsystem 408 that is coupled to the conversion engine 404 (e.g., via a coupling between the communication subsystem 408 and the processing system) and that may include a Network Interface Controller (NIC), a wireless communication devices, ports, and/or other communication components that would be apparent to one of skill in the art in possession of the present disclosure. For example, in the illustrated embodiment, the communication subsystem 408 includes a plurality of ports (e.g., the ports 408a, 408b, 408c, 408d, and up to 408e illustrated in FIG. 4) that may be coupled to an FC networking device, another FCF device, an FSB, and/or a server device as discussed below. The ports 408a-408e may be any of the FCF device ports 206a(1)-206a(5) or 206b(1)-206b(5) discussed above with reference to FIGS. 2A-2D. Furthermore, in some embodiments, components of the conversion engine 404 and/or the communication subsystem 408 may provide an NPG that performs the functionality of the conversion engines and/or server devices discussed below. However, as discussed above, the conversion engine 404 may be utilized to provide for other types of conversions while remaining within the scope of the present disclosure. While a specific FCF device 400 has been described, one of skill in the art in possession of the present disclosure will recognize that the FCF device 400 may include a variety of other components that perform conventional FCF device functionality, as well as the functionality described below, while remaining within the scope of the present disclosure.

Figure 5:
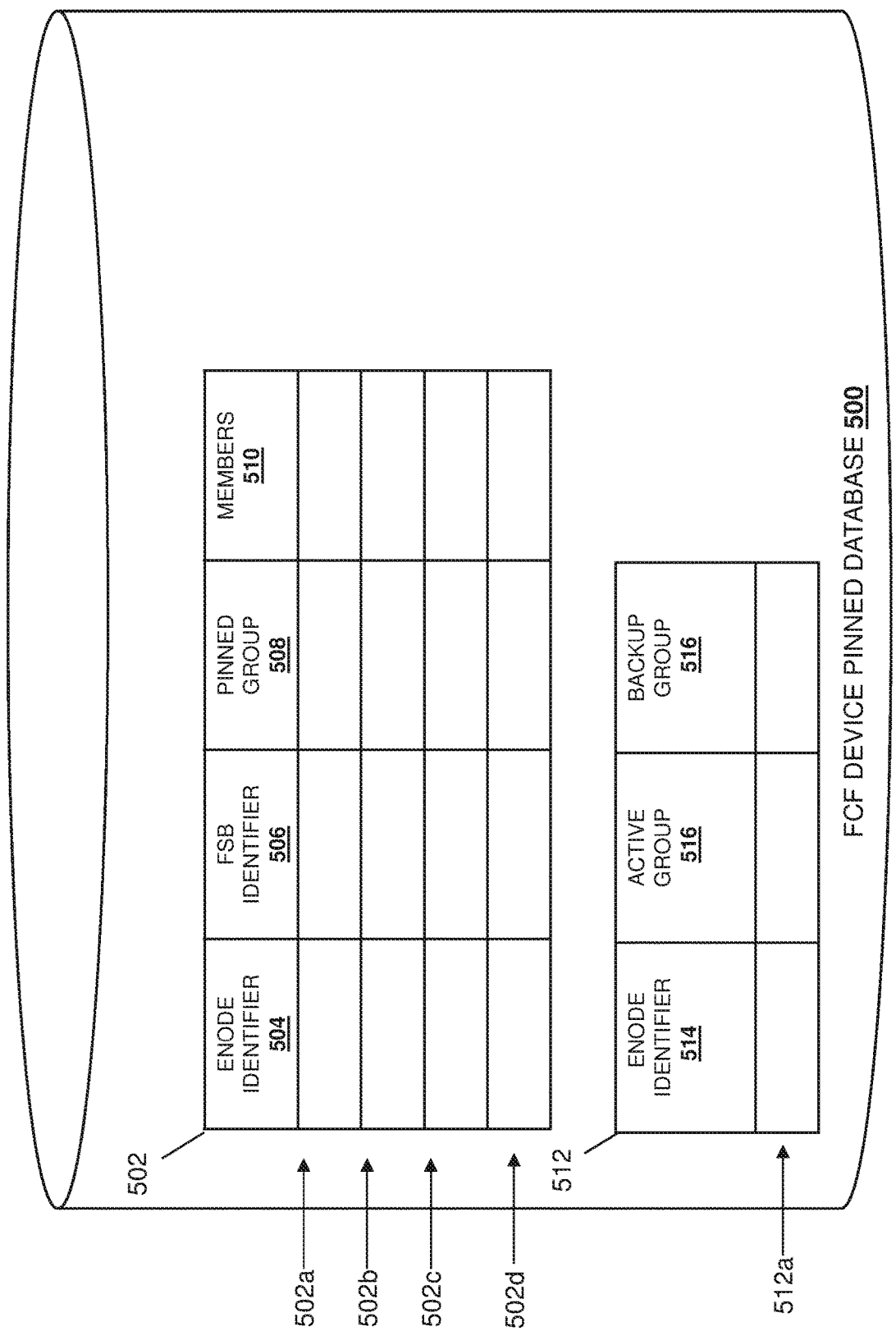
FIG. 5 is a schematic view illustrating an embodiment of an FCF device pinned database in the FCF devices of FIGS. 2A-2D.

Referring now to FIG. 5, an embodiment of an FCF device pinned database 500 is illustrated. In an embodiment, the FCF device pinned database 500 may be the FCF device pinned database 406 discussed above with reference to FIG. 4. In a specific example, the FCF device pinned database 500 may include an FCF device pinning table 502 that may identify, for example, FCF device ports of the FCF device 400 that are grouped and pinned for FCoE traffic based on the aggregated interface (e.g., a port channel) in which the FCF device ports are members. In the illustrated example, the FCF device pinned database 500 includes the FCF device pinning table 502 having FCF device pinning table entries 502a, 502b, 502c, and up to 502d. For example, for each FCF device pinning table entry 502a-d, the FCF device pinning table 502 may include an ENode identifier column 504, an FSB identifier column 506, a pinned group identifier column 508, a member column 510 for FCF device ports that are members of the aggregated interface, and/or any other information column that would be apparent to one of skill in the art to pin FCF device ports of the FCF device 206a and/or 206b for FCoE traffic. However, one of skill in the art in possession of the present disclosure will recognize that the FCF device pinned database 500 and/or the FCF device pinning table 502 may include and/or store other information to enable the functionality discussed below while remaining within the scope of the present disclosure.

In a specific example, the FCF device pinned database 500 may include an FCF device FCoE backup table 512 that may identify, for example, an active FCoE pinned group and a backup FCoE pinned group for FCoE traffic originating from a particular server device port (e.g., ENode). The active and backup FCoE pinned groups may reference pinned groups in FCF device pinning table 502 under the pinned group identifier column 508. In the illustrated example, the FCF device pinned database 500 includes the FCF device FCoE backup table 512 having the FCF device FCoE backup table entries 512a and up to 512b. For example, for each FCF device FCoE backup table entry 512a-b, the FCF device FCoE backup table 512 may include an ENode identifier column 514, an active pinned group identifier column 516, a backup pinned group identifier column 518, and/or any other information column that would be apparent to one of skill in the art to identify an active path and a backup path for FCoE traffic. However, one of skill in the art in possession of the present disclosure will recognize that the FCF device pinned database 500 and/or the FCF device FCoE backup table 512 may include and/or store other information to enable the functionality discussed below while remaining within the scope of the present disclosure.

Figure 6:
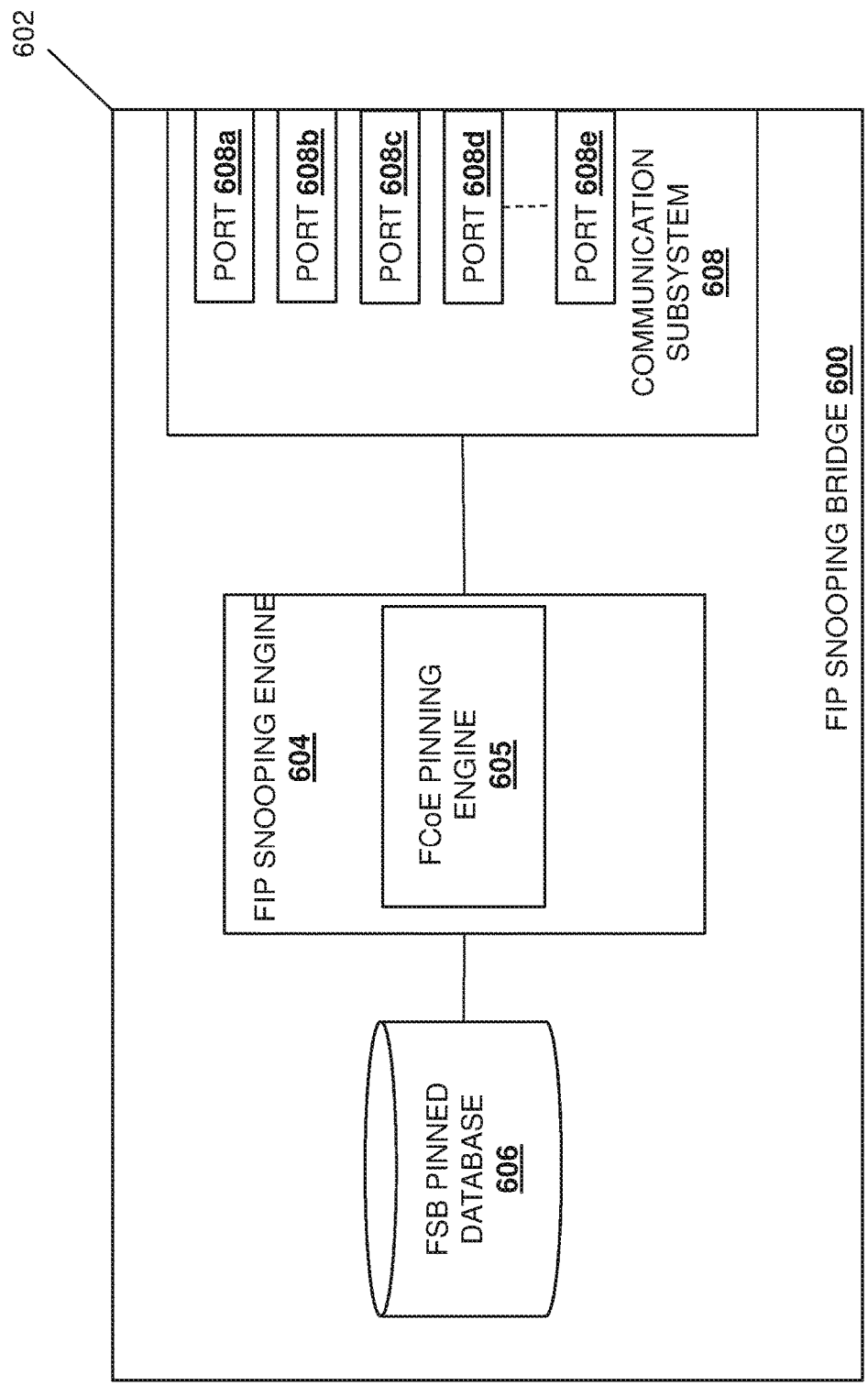
FIG. 6 is a schematic view illustrating an embodiment of an FCoE Initialization Protocol (FIP) Snooping Bridge (FSB) in the FCoE pinning systems of FIGS. 2A-2D.

Referring now to FIG. 6, an embodiment of an FCoE Initialization Protocol (FIP) Snooping Bridge (FSB) 600 is illustrated that may be the FSB 204a or 204b discussed above with reference to FIGS. 2A-2D. As such, the FSB 600 may be the IHS 100 discussed above with reference to FIG. 1 and/or may include some or all of the components of the IHS 100, and in specific examples may be an FCoE transit switch or FCF device. In the illustrated embodiment, the FSB 600 includes a chassis 602 that houses the components of the FSB 600, only some of which are illustrated in FIG. 6. For example, the chassis 602 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an FIP snooping engine 604 that is configured to perform the functions of the FIP snooping engines and FSBs discussed below. The chassis 602 may also house a storage system (not illustrated, but which may include the storage device 108 discussed above with reference to FIG. 1) that is coupled to the FIP snooping engine 604 (e.g., via a coupling between the storage system and the processing system) and that may include an FSB pinned database 606 that is configured to store the data utilized as discussed below. In another example, the FIP snooping engine 604 may include an FCoE pinning engine 605 that is configured to perform the functions of the FCoE pinning engines and FSBs discussed below such as, e.g., pinning one or ports of the FSB that are included in a port interface/aggregated interface, as discussed in detail below.

The chassis 602 may also house a communication subsystem 608 that is coupled to the FIP snooping engine 604 (e.g., via a coupling between the communication subsystem 608 and the processing system) and that may include a Network Interface Controller (NIC), a wireless communication devices, ports, and/or other communication components that would be apparent to one of skill in the art in possession of the present disclosure. For example, in the illustrated embodiment, the communication subsystem 608 includes a plurality of ports 608a, 608b, 608c, 608d, and up to 608e, any of which may be coupled to an FCF device as well as a server device, as discussed herein. The ports 608a-608e may be any of the FSB ports 204a(1)-204a(6) or 204b(1)-204b(5) discussed above with reference to FIGS. 2A-2D. While a specific FSB 600 has been described, one of skill in the art in possession of the present disclosure will recognize that the FSB 600 may include a variety of other components that perform conventional FC networking device functionality, as well as the functionality described below, while remaining within the scope of the present disclosure.

Figure 7:
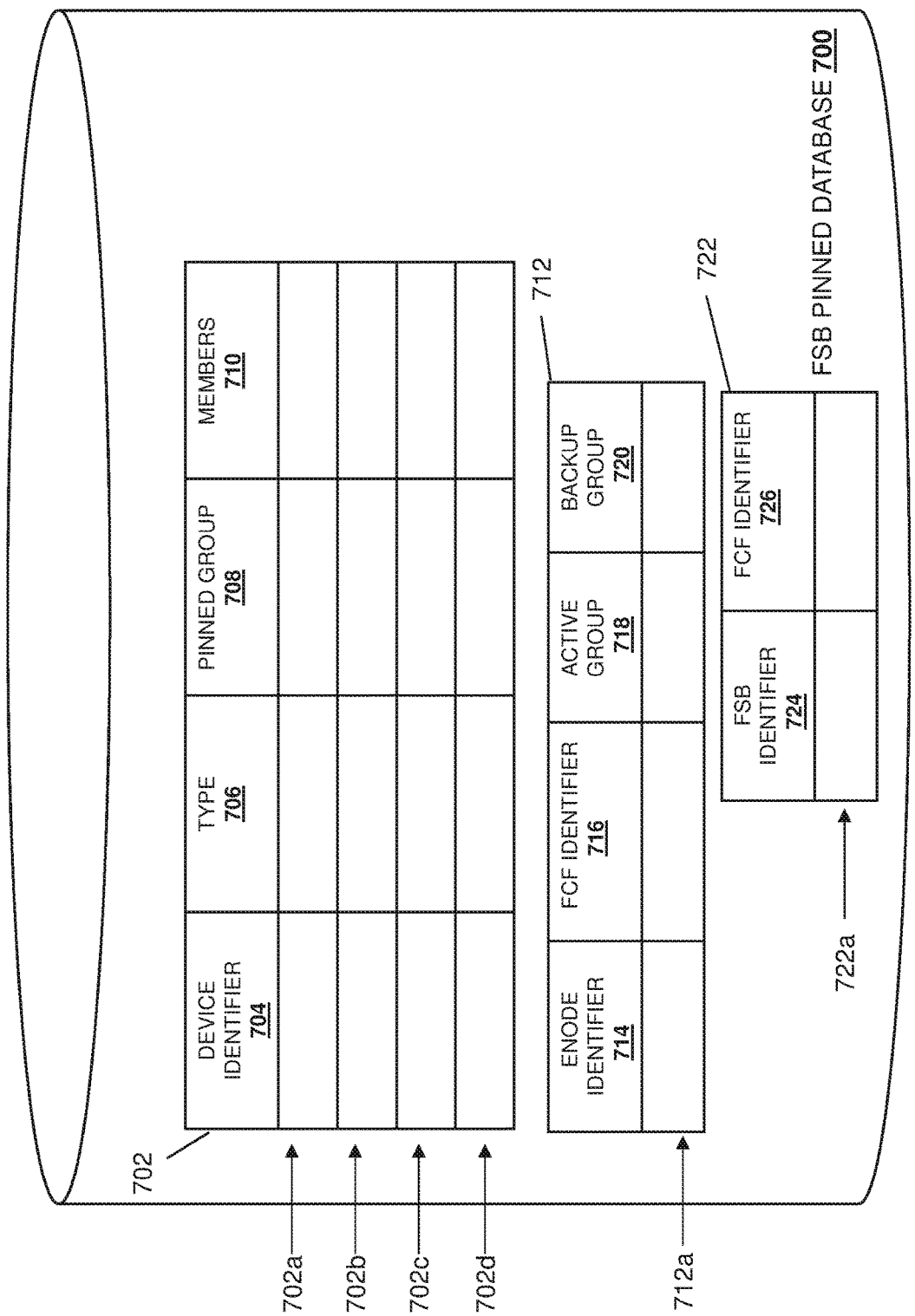
FIG. 7 is a schematic view illustrating an embodiment of an FSB pinned database in the FSB of FIG. 2A-2D.

Referring now to FIG. 7, an embodiment of an FSB pinned database 700 is illustrated. In an embodiment, the FSB pinned database 500 may be the FSB pinned database 606 discussed above with reference to FIG. 6. In a specific example, the FSB pinned database 700 may include an FSB pinning table 702 that may identify, for example, FSB ports of the FSB 600 that are grouped and pinned for FCoE traffic based on the aggregated interface (e.g., a port channel) in which the FSB ports are members. In the illustrated example, the FSB pinned database 700 includes the FSB pinning table 702 having FSB pinning table entries 702a, 702b, 702c, and up to 702d. For example, for each FSB pinning table entry 702a-d, the FSB pinning table 702 may include an connected device identifier column 704, an connected device type column 706 (e.g., an ENode or an FCF device), a pinned group identifier column 708, a member column 710 for FSB ports that are members of the aggregated interface, and/or any other information column that would be apparent to one of skill in the art to pin FSB ports of the FSBs 204a and/or 204b for FCoE traffic. However, one of skill in the art in possession of the present disclosure will recognize that the FSB pinned database 700 and/or the FSB pinning table 702 may include and/or store other information to enable the functionality discussed below while remaining within the scope of the present disclosure.

In a specific example, the FSB pinned database 700 may include an FSB FCoE backup table 712 that may identify, for example, an active FCoE pinned group and a backup FCoE pinned group for FCoE traffic originating from a particular ENode and destined for a particular FCF device. The active and backup FCoE pinned groups may reference pinned groups in FSB pinning table 702 under the pinned group identifier column 708. In the illustrated example, the FSB pinned database 700 includes the FSB FCoE backup table 712 having a single FSB FCoE backup table entry 712a. However, any number of FSB FCoE backup table entries may be present. For the FSB FCoE backup table entry 712a, the FSB FCoE backup table 712 may include an ENode identifier column 714, an FCF device identifier column 716, an active pinned group identifier column 718, a backup pinned group identifier column 720, and/or any other information column that would be apparent to one of skill in the art to identify an active path and a backup path for FCoE traffic at the FSB.

Additionally, the FSB pinned database 700 may include an FSB peer SAN reachability table 722 that identifies peer FSBs coupled to the FSB that is maintaining the FSB pinned database 700, and identifies FCF devices that are accessible by that peer FSB. In the illustrated example, the FSB pinned database 700 includes the FSB peer SAN reachability table 722 having a single FSB peer SAN reachability table entry 722a. However, any number of FSB peer SAN reachability table entries may be present. For the FSB peer SAN reachability table entry 722a, the FSB peer SAN reachability table 722 may include an FSB identifier column 724, an FCF device identifier column 726, and/or any other information column that would be apparent to one of skill in the art to identify peer FSBs and the FCF devices to which those peer FSBs are coupled. However, one of skill in the art in possession of the present disclosure will recognize that the FSB pinned database 700, the FSB FCoE backup table 712, and/or the FSB peer SAN reachability table 722 may include and/or store other information to enable the functionality discussed below while remaining within the scope of the present disclosure.

Figure 8:
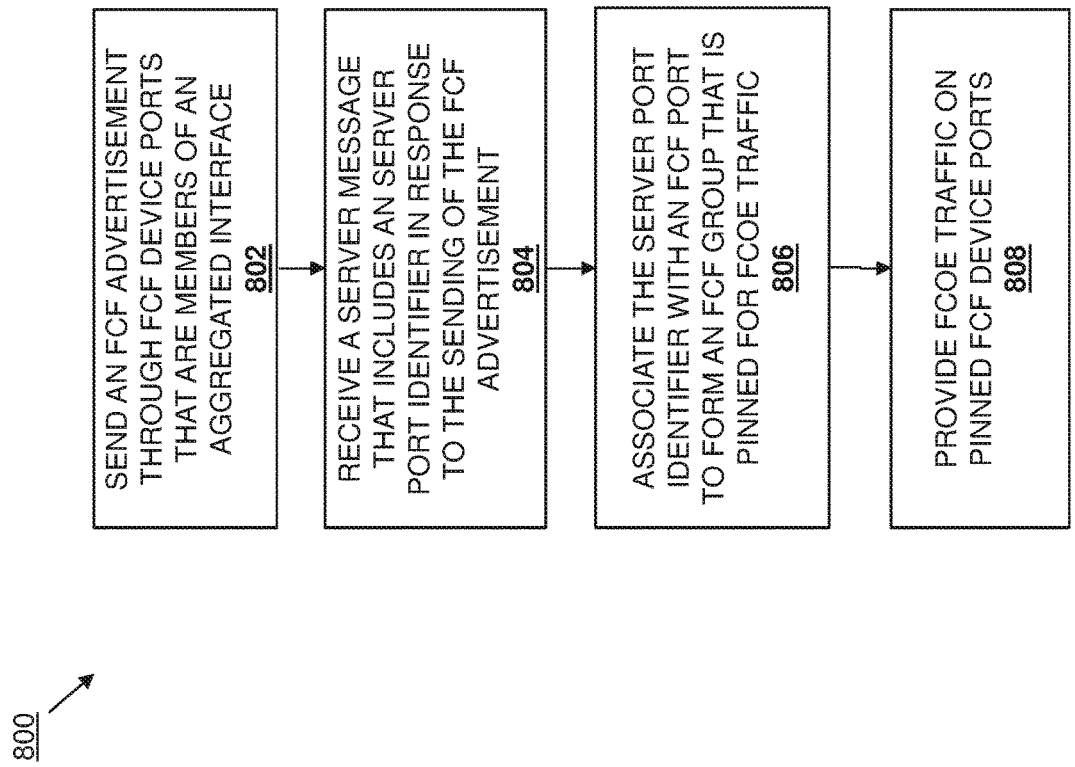
FIG. 8 is a flow chart illustrating an embodiment of a method for providing FCoE pinning.

Referring now to FIG. 8, an embodiment of a method 800 for FCoE pinning is illustrated. As discussed above, in conventional systems that support FCoE and that utilize an aggregation protocol (e.g., VLT) that aggregates links between an ENode, an FCF device and, in some embodiments, an FSB in order to provide an aggregated interface (e.g., a port channel also referred to as a VLT LAG), an administrator has to statically pin one of the ports in the aggregated interface for FCoE traffic per SAN fabric, and that administrator must configure the port to be pinned via a Command Line Interface (CLI). However, this manual pinning configuration of ports for FCoE traffic is inefficient when there are multiple links in a SAN that are included in the aggregated interface. For example, if there are multiple links between an FSB and an FCF device provided in a SAN and/or VLAN, only one set of ports (i.e., a single FSB port and a single FCF device port that provide a link) that are members of the aggregated interface may be configured as an FCoE pinned port. Furthermore, in conventional FCoE pinning systems, four port CNAs can only have one of those ports used for FCoE traffic per SAN fabric, and required one of those ports to be dedicated to Ethernet traffic. As such, out of the four ports on the CNA, only two ports of the CNA can be pinned for FCoE traffic (converged traffic cannot be used when using aggregated interfaces due to the one port pinning limit.) The systems and methods of the present disclosure provide an FCoE pinning system that automatically pins ports for FCoE traffic if the ports are members of an aggregated interface. Pinning tables are generated by FCFs and FSBs that group together multiple links that are pinned as groups such that FCoE traffic can be routed through all ports and links that are part of the aggregated interface. Thus, the pinning tables and the FCoE pinning discussed herein decreases latency with respect to the FCoE traffic being sent, allows for converged traffic from a four port CNA where the ports of the CNA are aggregated, alleviates congestion on the links between the an ENode and an FC storage device, and/or provides other benefits that will be apparent to one of skill in the art in possession of the present disclosure when additional links between an ENode and a FCF device are utilized for FCoE traffic.

The method 800 begins at block 802 where an FCF advertisement is sent through FCF device ports that are members of an aggregated interface. In an embodiment of block 802, the FCF device 206a and/or 206b of FIGS. 2A-2D may send an FCF advertisement though each FCF device port that is a member of the aggregated interface 212 of FIG. 2A and/or the aggregated interface 218 of FIGS. 2B-2D (e.g., a port channel (i.e., a VLT LAG)). Each FCF advertisement may include an FCF device identifier (e.g., an FCF Media Access Control (MAC) address) that identifies the FCF device from which the FCF identifier originated.

Figure 9A:
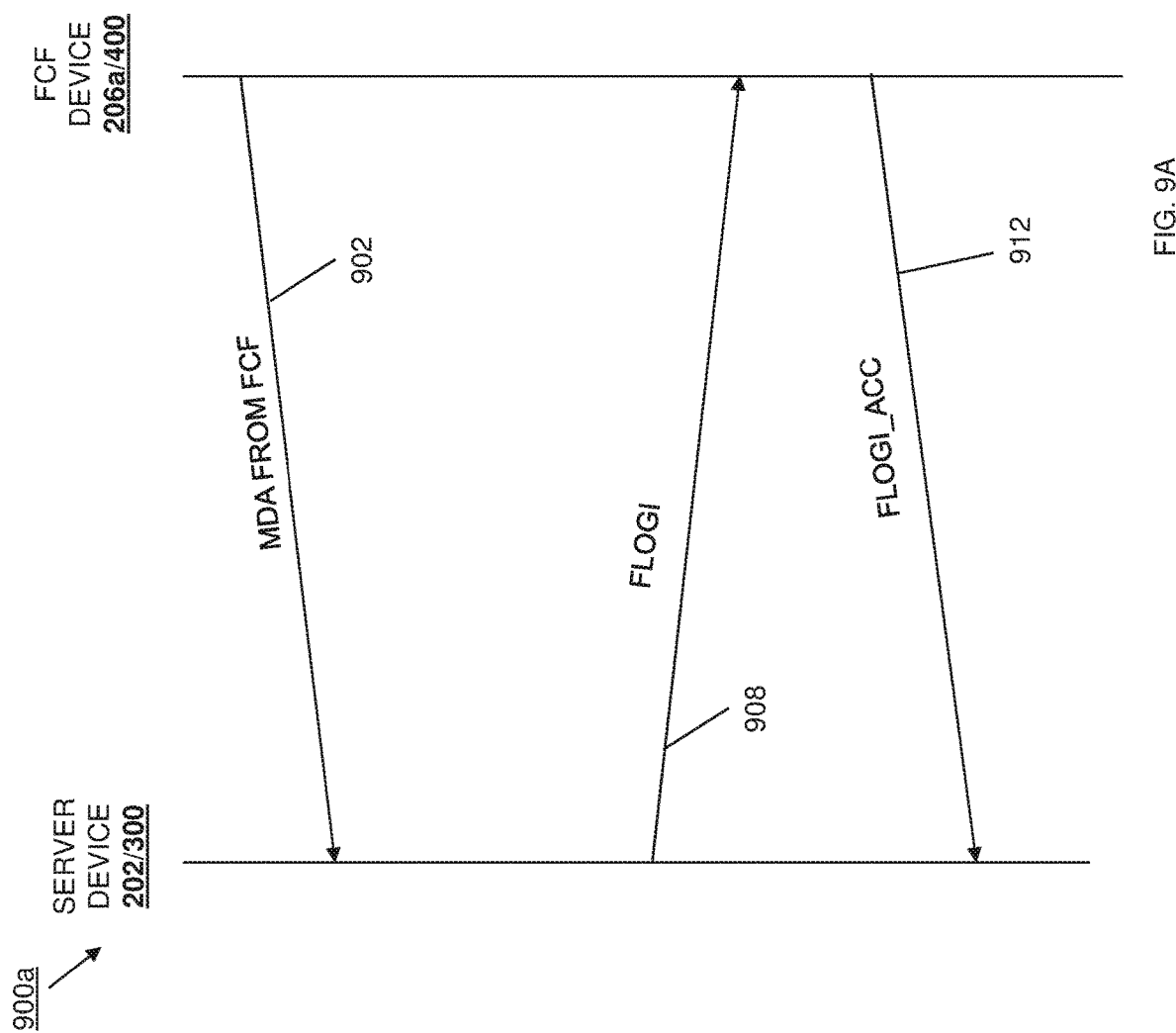
FIG. 9A is a diagram illustrating an embodiment of FCoE pinning during the method of FIG. 8.

Referring now to FIG. 9A, an example FCoE pinning communication diagram 900a illustrates the communications between the server device 202/400 and the FCF device 206a/400 during the method 800. The FCoE pinning communication diagram 900a is discussed with reference to the FCoE pinning system 200a of FIG. 2A. In the illustrated example, FCF device 206a sends a multicast discovery advertisement (MDA) 902 through each of: the FCF device port 206a(1) via the link 210a, and the FCF device port 206a(2) via the link 210b, each of which are members of the aggregated interface 212. Each MDA 902 may include an FCF MAC address that identifies the FCF device 206a. The corresponding server ports 202(1) and 202(2) may receive the MDA 902. While the examples in FIG. 9A are directed to the communications between the FCF device 206a and server device 202, one of skill in the art in possession of the present disclosure will recognize that the methods herein may be applied to communications between the FCF device 206b and the server device 202 while remaining within the scope of the present disclosure and are omitted to simplify the discussion.

Figure 9B:
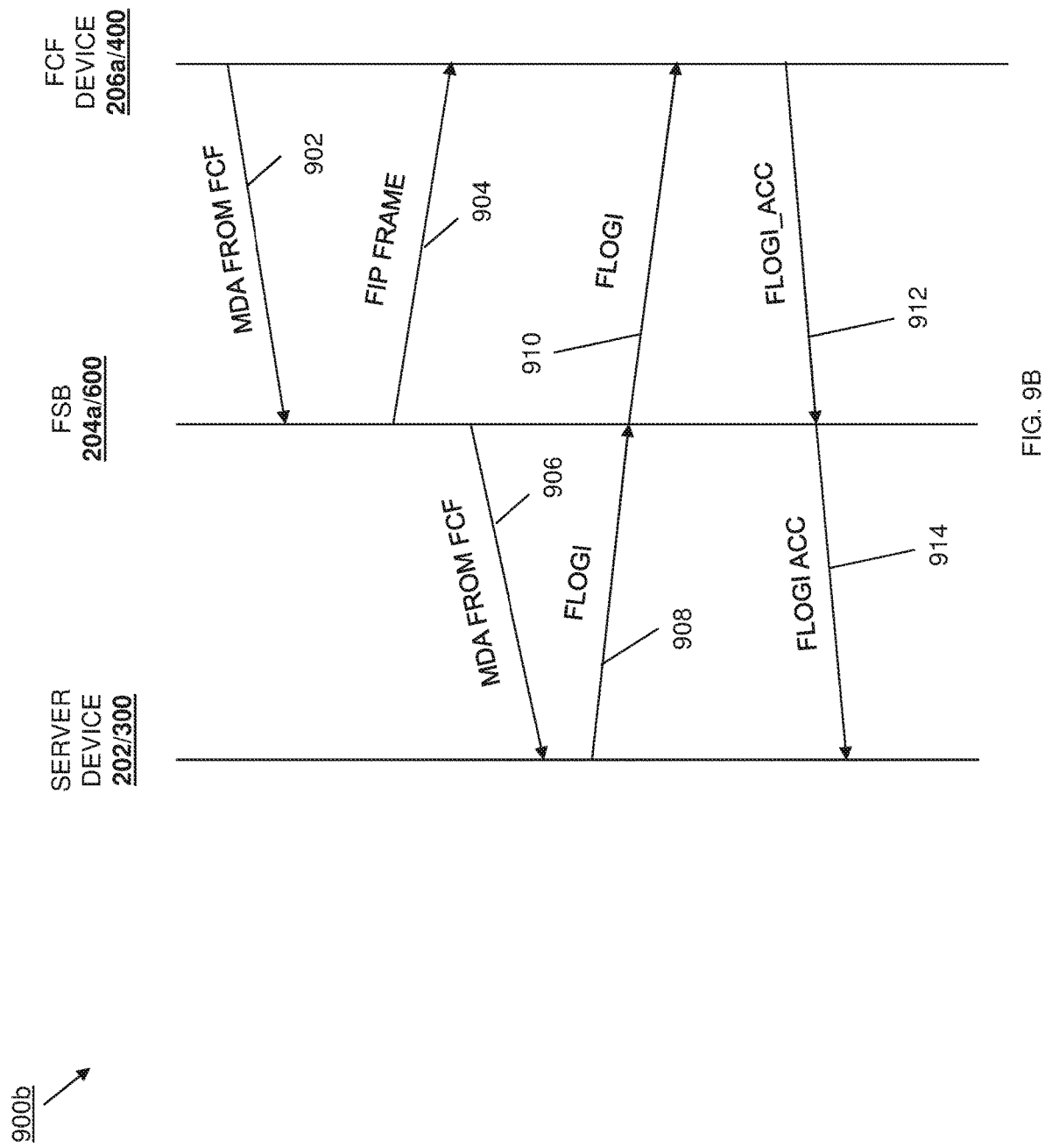
FIG. 9B is a diagram illustrating an embodiment of FCoE pinning during the method of FIG. 8.

Referring now to FIG. 9B, an example FCoE pinning communication diagram 900b illustrates communications between the server device 202/300 and the FSB 204a/600, and between the FSB 204a/600 and the FCF device 206a/400, during the method 800. FCoE pinning communication diagram 900b is discussed with reference to the FCoE pinning systems 200b-200d of FIGS. 2B-2D. In the illustrated example, the FCF device 206a sends an MDA 902 through each of: the FCF device port 206a(1) via the link 214f, and the FCF device port 206a(2) via the link 214g of FIGS. 2B and 2C, each of which are members of the aggregated interface 212. In the FCoE pinning system 200d of FIG. 2D, the FCF device 206a sends the MDA 902 through the FCF device ports 206a(1), 206a(2), and 206a (3). Each MDA 902 may include an FCF MAC address that identifies the FCF device 206a. The corresponding FSB ports 204a(4) and 204a(5) on the FSB 204a may receive the MDA 902. While the examples in FIG. 9B are directed to the communications between the FCF device 206a and the FSB 204a, one of skill in the art in possession of the present disclosure will recognize that the methods herein may be applied to communications between the FCF device 206a and the FSB 204b and/or between FCF device 206b and the FSBs 204(a) and 204(b) while remaining within the scope of the present disclosure and are omitted to simplify the discussion.

In response to receiving the FCF advertisement, the FSB 204(a) may associate the FCF device identifier included in the FCF advertisement with the FSB port that received the FCF advertisement in order to form a first FSB group and pin the first FSB group for FCoE traffic. Additional FSB ports may also be added to the same FSB group based on whether those FSB ports received an FCF advertisement with the same FCF device identifier. In an embodiment of block 802, and with reference to the FSB pinned database 700 of FIGS. 10A, 11A, and 12A, the FCoE pinning engine 605 may generate one or more FSB pinning tables 702. For example, the FCF device 206a of the FCoE pinning system 200b in FIG. 2B may maintain an FSB pinning table 702 in the FSB pinned database 700 of FIG. 10A that provides the pinned group members of FSB ports. Because only the link 214f is provided between FSB 204a and FCF device 206a, the FSB 204 may only receive the MDA 902 that includes the FCF device MAC address for the FCF device 206a on the FSB port 204a(4). The FCF device MAC address of the FCF device 206a may be associated FSB port 204a(4) upon which the FSB 204a received the MDA 902. For example, the FSB pinning table entry 702a of the FSB pinning table 702 illustrates how the FCoE pinning engine 605 may operate to pin the FSB port 204a(4) with FCoE traffic by associating the FCF device identifier of the FCF device 206a ("FCF_MAC206a") to an FSB port identifier ("FSB port 204a(4)").

Figure 11A:
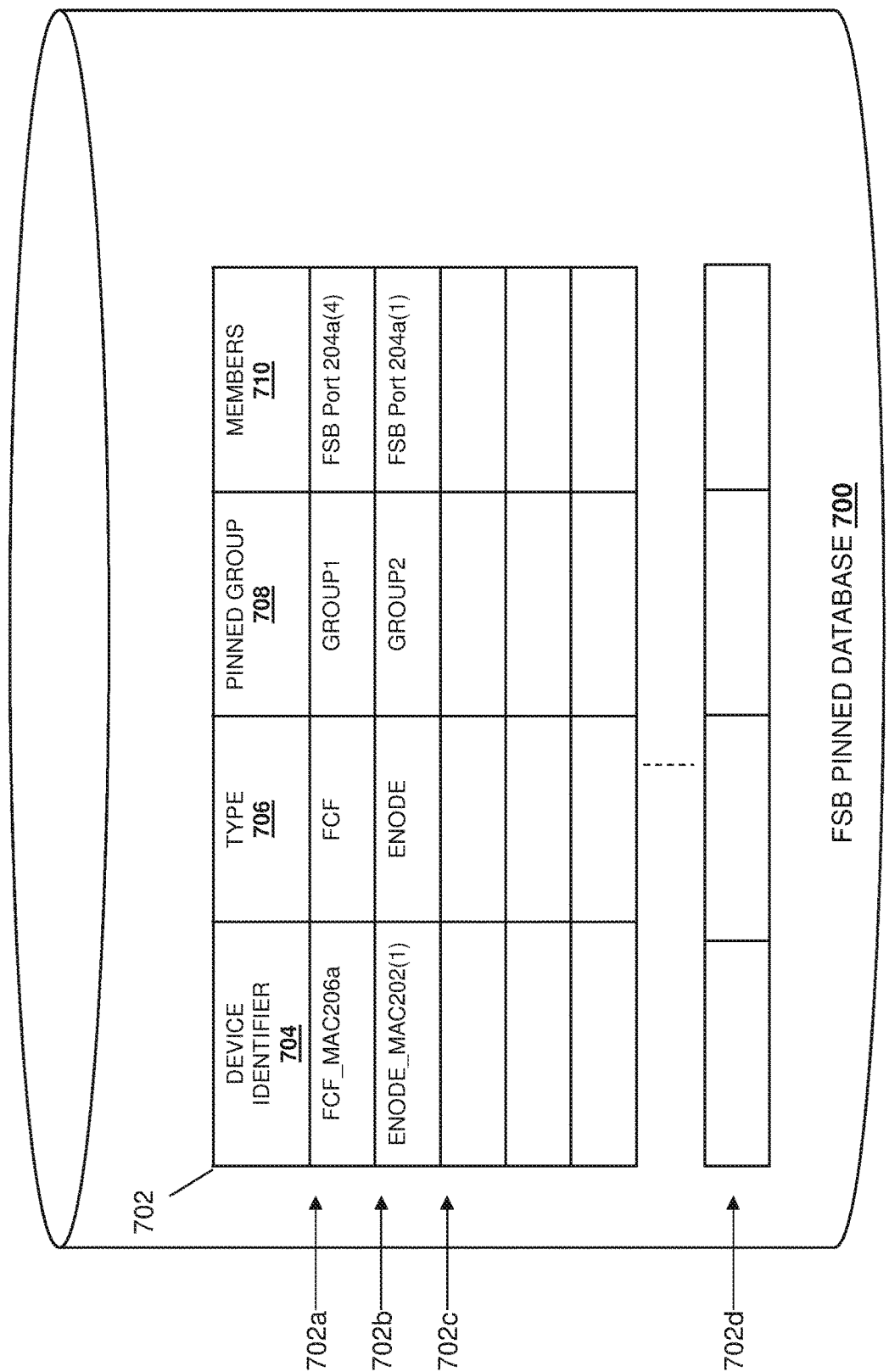
FIG. 11A is a schematic view illustrating an embodiment of information being provided in the FSB pinned database of FIG. 7 for the FCoE pinning system of FIG. 2C during the method of FIG. 8.

In another example and with reference to the FSB 204a of the FCoE pinning system 200c in FIG. 2C, the FSB 204a may maintain an FSB pinning table 702 in the FSB pinned database 700 of FIG. 11A that provides the pinned group members of FSB ports. Because only the link 214f is provided between FSB 204a and FCF device 206a, the FSB 204 may only receive the MDA 902 that includes the FCF device MAC address for the FCF device 206a on the FSB port 204a(4). The FCF MAC of FCF device 206a may be associated with the FSB port 204a(4) upon which the FSB 204a received the MDA 902. For example, the FSB pinning table entry 702a of the FSB pinning table 702 illustrates how the FCoE pinning engine 605 may operate to pin the FSB port 204a(4) with FCoE traffic by associating the FCF device identifier of the FCF device 206a ("FCF_MAC206a") to an FSB port identifier ("FSB port 204a(4)").

Figure 12A:
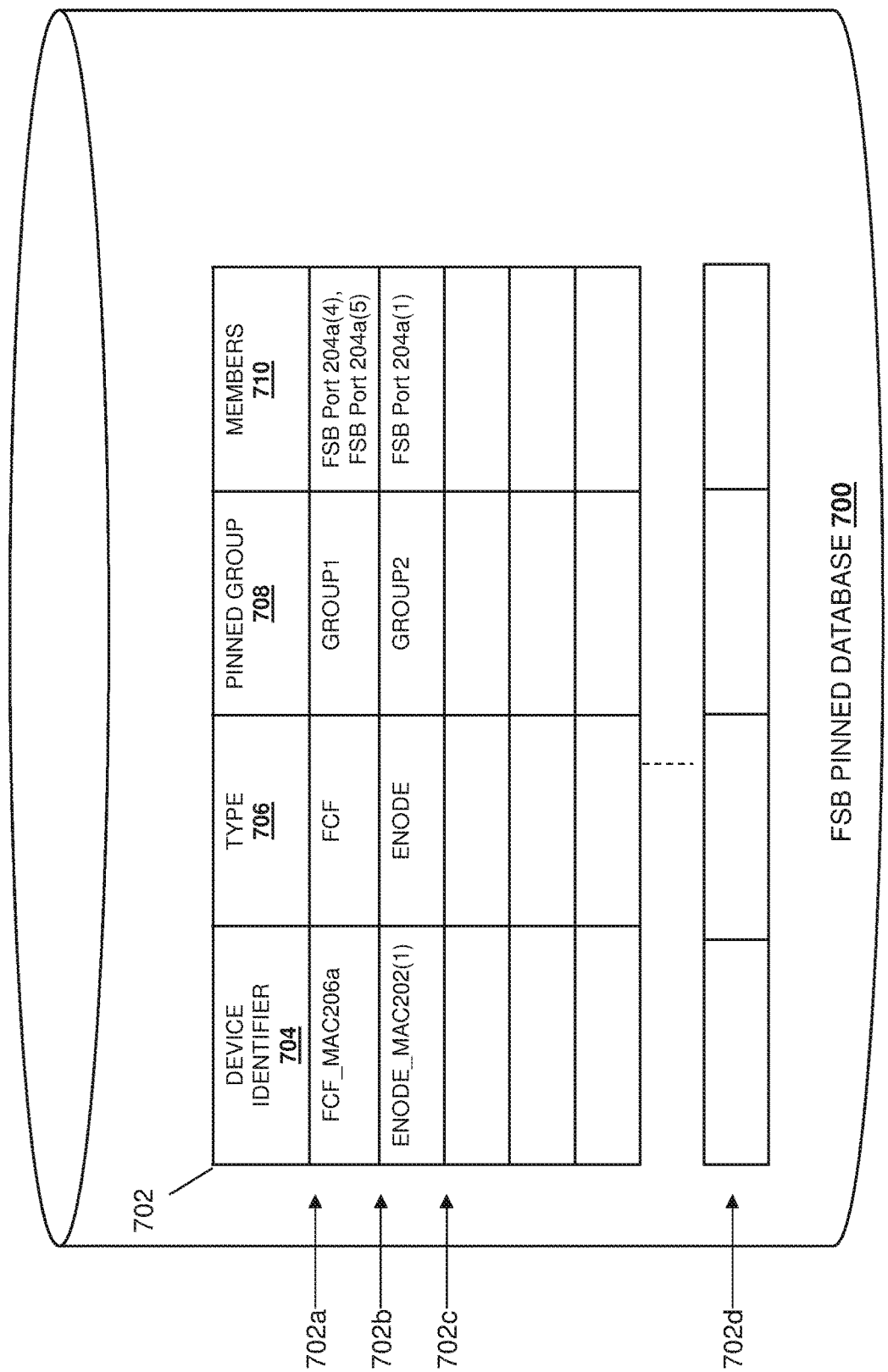
FIG. 12A is a schematic view illustrating an embodiment of information being provided in the FSB pinned database of FIG. 7 for the FCoE pinning system of FIG. 2D during the method of FIG. 8.

In another example and with reference to the FSB 204a of the FCoE pinning system 200d in FIG. 2D, the FSB 204a may maintain an FSB pinning table 702 in the FSB pinned database 700 of FIG. 12A that provides the pinned group members of FSB ports. In this example, there are two links (e.g., the link 214f and the link 214g) connecting the FSB 204 with the FCF device 206a. The FSB 204a may receive the MDA 902 that includes the FCF device MAC address for the FCF device 206a on the FSB port 204a(4) and on the FSB port 204a(5). The FCF MAC of FCF device 206a may be associated with the FSB port 204a(4) and the FSB port 204a(5) upon which the FSB 204a received the MDA 902. For example, the FSB pinning table entry 702a of the FSB pinning table 702 illustrates how the FCoE pinning engine 605 may operate to pin the group of the FSB port 204a(4) and the FSB port 204a(5) with FCoE traffic by associating the FCF device identifier of the FCF device 206a ("FCF_MAC206*a*") to FSB port identifiers ("FSB port 204*a*(4)") and ("FSB port 204*a*(5)").

After the FCoE pinning at the FSB 204*a* is completed, the FSB 204*a* may send an FSB pinned notification, which includes an FSB identifier, through the FSB ports that are members of the pinned group. As illustrated in FIG. 9B, the FSB pinned notification may be a special FIP frame 904 that indicates to the FCF device 206*a* that the FSB 204*a* has pinned FSB ports of the aggregated interface for FCoE traffic. The FSB identifier may be an identifier of the FSB 204*a* such as, for example, an FSB MAC address. For example, the FSB 204*a* in the FCoE pinning system 200*b* of FIG. 2B and the FCoE pinning system 200*c* in FIG. 2C may send the FSB pinned notification through the FSB port 204*a*(4), and the FSB 204*a* in the FCoE pinning system 200*d* FIG. 2D may send the FSB pinned notification through the FSB port 204*a*(4) and the FSB port 204*a*(5).

In various embodiments, the FSB 204*a* may forward the FCF advertisement received from the FCF device 206*a*. The FCF advertisement may be forwarded through any FSB port that is a member of the aggregated interface 216. For example, the FSB 204*a* of the FCoE pinning system 200*b* of FIG. 2B may send a forwarded MDA 906 through the FSB port 204*a*(1) and the FSB port 204*a*(2). The FSB 204*a* of the FCoE pinning system 200*c* of FIG. 2C and the FCoE pinning system 200*d* of FIG. 2D may send the forwarded MDA 906 through the FSB port 204*a*(1).

The method 800 then proceeds to block 804 where a server message that includes an ENode identifier is received in response to the sending of the FCF advertisement at block 802. In an embodiment of block 804, the FCF device 206*a* of the FCoE pinning system 200*a* of FIG. 2A may receive a server message from the server device 202 that was sent by the server device 202 in response to the server device 202 receiving the FCF advertisement. For example and with reference to FIG. 9A, the server device 202 may receive the MDA 902 on the server port 202(1) and 202(2). The server device 202 may then provide a server message, such as a FLOGI 908, through the server port 202(1) that is then received at the FCF device port 206*a*(1). Similarly, the server device 202 may provide a FLOGI 908 through the server port 202(2) that is then received at the FCF device port 206*a*(2). While a FLOGI 908 is provided as a server device message in the illustrated embodiment, one of skill in the art in possession of the present disclosure will recognize that the server device message may be another server message that includes an ENode identifier such as a virtual local area network (VLAN) notification or a VLAN solicitation while remaining within the scope of the present disclosure as well.

In an embodiment of block 804, and with reference to FIG. 9B and the FCoE pinning systems 200*b*-200*d* of FIGS. 2B-2D, the FCF device 206*a* may receive the server message through the FCF device port 206*a*(1) and/or, if sent in the FCoE pinning system 200*d* of FIG. 2D, through the FCF device port 206*a*(2). For example, the server device 202 may receive the forwarded MDA 906 through server port 202(1) and/or, if sent in the FCoE pinning system 200*b* of FIG. 2D, through the server port 202(2). In response, the server device 202 may send the server message (e.g., FLOGI 908) through the server port 202(1) and/or through the server port 202(2). The FSB 204*a* may receive the server message through FSB ports 204*a*(1) and/or 204*a*(2). The FSB 204*a* may learn the ENode identifier (e.g., an ENode MAC address) from the server message that is received on at least one of the FSB ports 204*a*(1) and/or 204*a*(2) that are members of the aggregated interface 216, and associate those ports with a respective ENode identifier to form a respective group that is pinned for FCoE traffic.

Figure 10A:
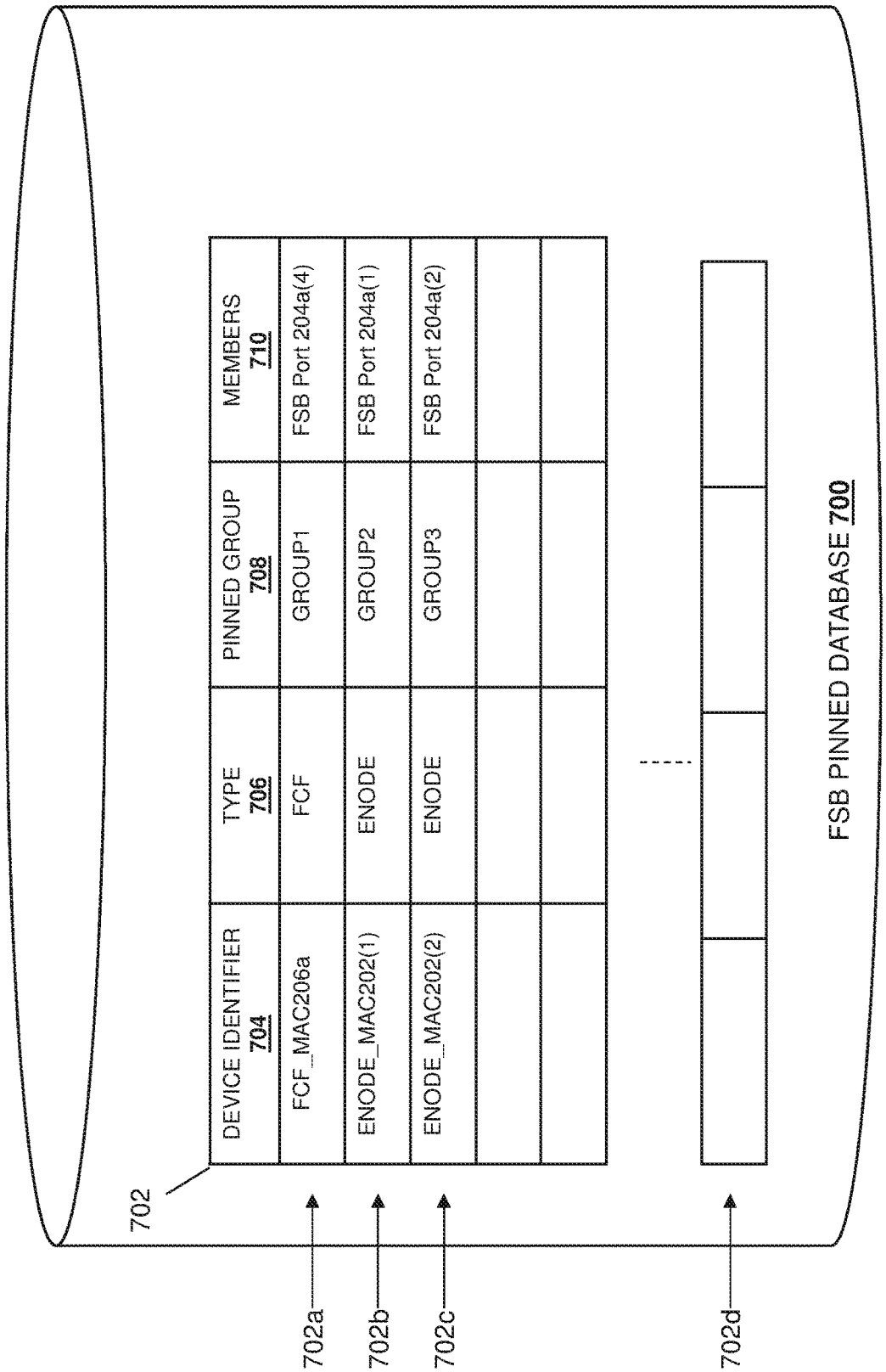
FIG. 10A is a schematic view illustrating an embodiment of information being provided in the FSB pinned database of FIG. 7 for the FCoE pinning system of FIG. 2B during the method of FIG. 8.

In an embodiment of block 804, and with reference to the FSB pinned database 700 of FIGS. 10A, 11A, and 12A, the FCoE pinning engine 605 may add the ENode identifier to its respective to the FSB pinning table 702. For example, the FSB 204*a* of the FCoE pinning system 200*b* in FIG. 2B may add pinned groups of ENode identifiers and FSB ports to the FSB pinning table 702 in the FSB pinned database 700 of FIG. 10A. For example, the FSB pinning table entry 702*b* of the FSB pinning table 702 illustrates how the FCoE pinning engine 605 may operate to pin the FSB port 204*a*(1) with FCoE traffic by associating the ENode identifier ("ENode_MAC202(1)") of the server port 202(1) of server device 202*a* with an FSB port identifier ("FSB port 204*a*(1)"). Also, the FSB pinning table entry 702*c* of the FSB pinning table 702 illustrates how the FCoE pinning engine 605 may operate to pin the FSB port 204*a*(2) with FCoE traffic by associating the ENode identifier ("ENode_MAC202(2)") of the server port 202(2) of the server device 202*a* with an FSB port identifier ("FSB port 204*a*(2)"). Thus, because of the Aof those links that would be available in conventional systems.

In another example, and with reference to the FSB 204*a* of the FCoE pinning system 200*c* in FIG. 2C, the FSB 204*a* may add pinned groups of ENode identifiers and FSB ports to the FSB pinning table 702 in the FSB pinned database 700 of FIG. 11A. For example, the FSB pinning table entry 702*b* of the FSB pinning table 702 illustrates how the FCoE pinning engine 605 may operate to pin the FSB port 204*a*(1) with FCoE traffic by associating the ENode identifier ("ENode_MAC202(1)") of the server port 202(1) of server device 202*a* with the FSB port ("FSB port 204*a*(1)"). Similarly and with reference to the FSB 204*a* of the FCoE pinning system 200*d* in FIG. 2D, the FSB 204*a* may add pinned groups of the ENode identifiers and the FSB ports to the FSB pinning table 702 in the FSB pinned database 700 of FIG. 12A. For example, the FSB pinning table entry 702*b* of the FSB pinning table 702 illustrates how the FCoE pinning engine 605 may operate to pin the FSB port 204*a*(1) with FCoE traffic by associating the ENode identifier ("ENode_MAC202(1)") of the server port 202(1) of server device 202*a* with the FSB port ("FSB port 204*a*(1)").

The FSB 204*a* may then forward the server message(s) to the FCF device 206*a* such that they are received by the FCF device 206*a*. In the example illustrated in 9B, the FSB 204*a* may forward the FLOGI 910 to the FCF device 206. For example and with reference to the FCoE pinning system 200*b* of FIG. 2B, the FSB 204*a* may forward the server message received from the server port 202(1) and the server message received from the server port 202(2) through the FSB port 204*a*(4). The FCF device 206*a* may then receive the server messages through the FCF device port 206*a*(1). In another example and with reference to the FCoE pinning system 200*c* of FIG. 2C, the FSB 204*a* may forward the server message received from the server port 202(1) through the FSB port 204*a*(4). The FCF device 206*a* may then receive the server message through the FCF device port 206*a*(1). In another example and with reference to the FCoE pinning system 200*d* of FIG. 2D, the FSB 204*a* may forward the server message received from the server port 202(1) through the FSB port 204*a*(4) or the FSB port 204*a*(5). Because the FSB port 204*a*(4) and the FSB port 204*a*(5) are pinned for FCoE traffic and belong to the same group (as indicated in the FSB pinning table entry 702*a* of FIG. 12A), the FSB 204a may hash FCoE traffic, including the server messages, between the FSB port 204a(4) and the FSB port 204a(5).

The method 800 may then proceed to block 806 where an ENode identifier from the server message is associated with an FCF device port to form an FCF group that is then pinned for FCoE traffic. In an embodiment of block 806, the FCF device 206a of the FCoE pinning system 200a of FIG. 2A may associate the ENode identifier that was provided in the server message with the FCF device port on which that server message was received.

Figure 11B:
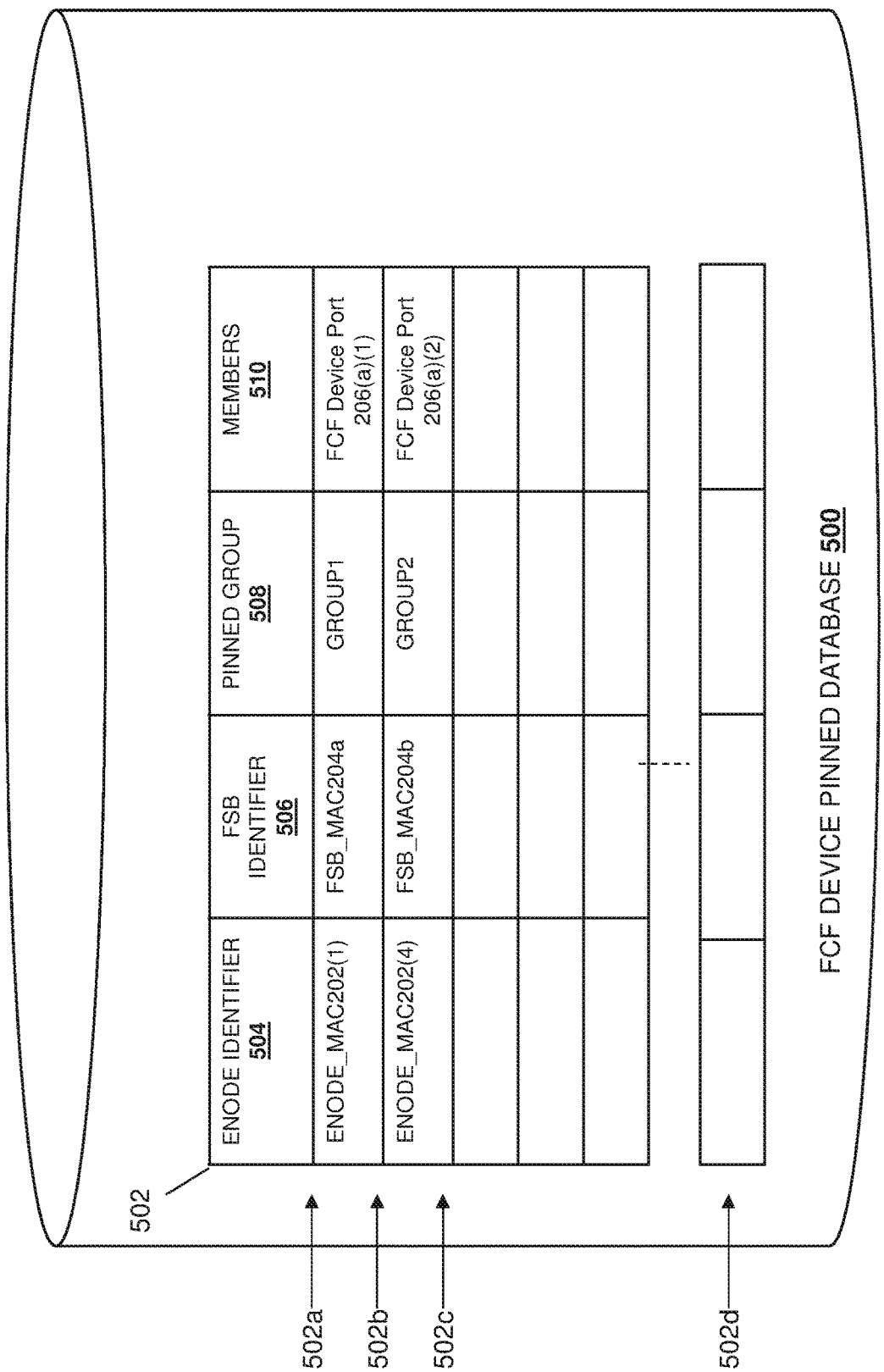
FIG. 11B is a schematic view illustrating an embodiment of information being provided in the FCF device pinned database of FIG. 5 for the FCoE pinning system of FIG. 2C during the method of FIG. 8.
Figure 12B:
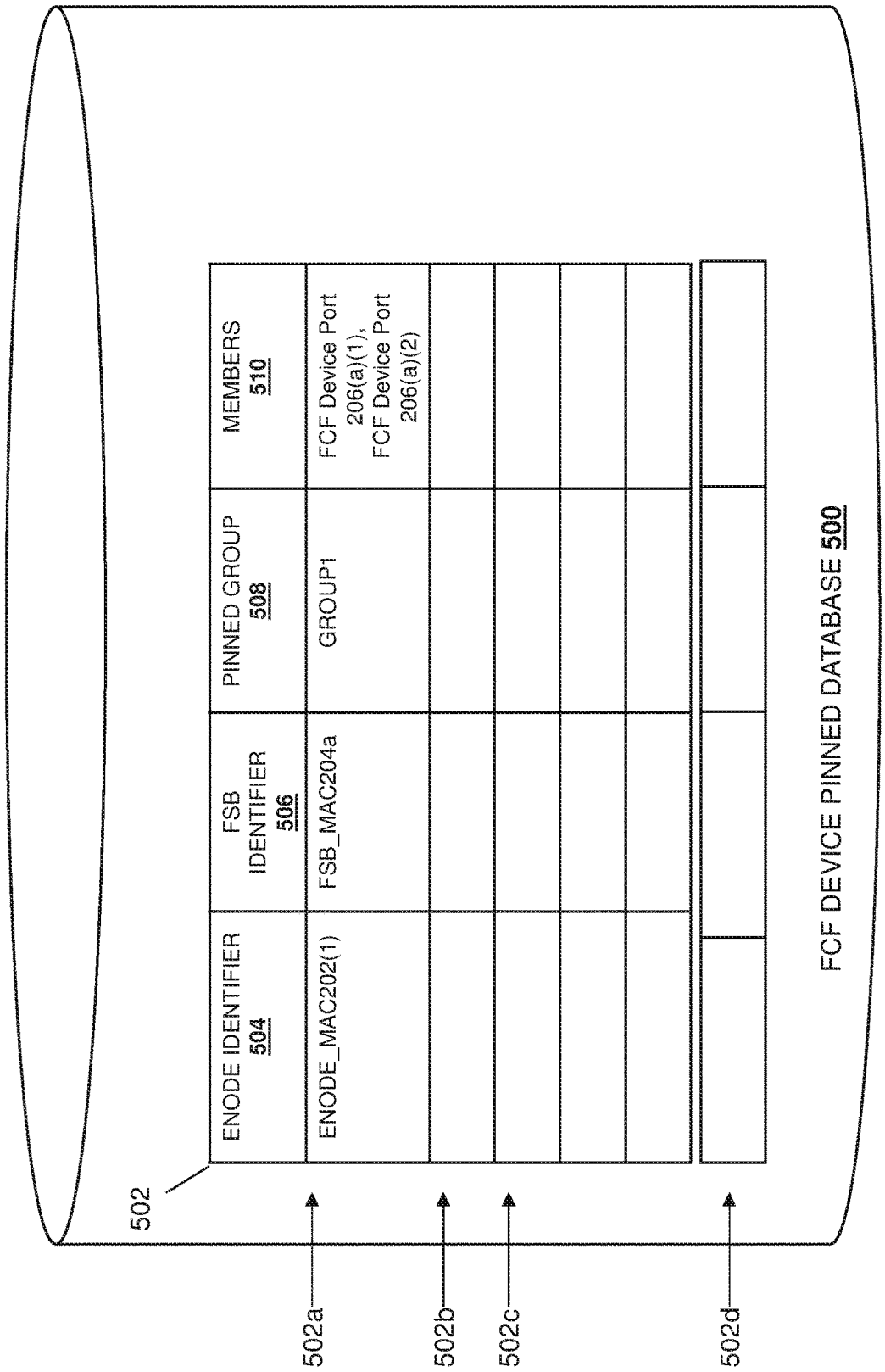
FIG. 12B is a schematic view illustrating an embodiment of information being provided in the FCF device pinned database of FIG. 5 for the FCoE pinning system of FIG. 2D during the method of FIG. 8.
Figure 13:
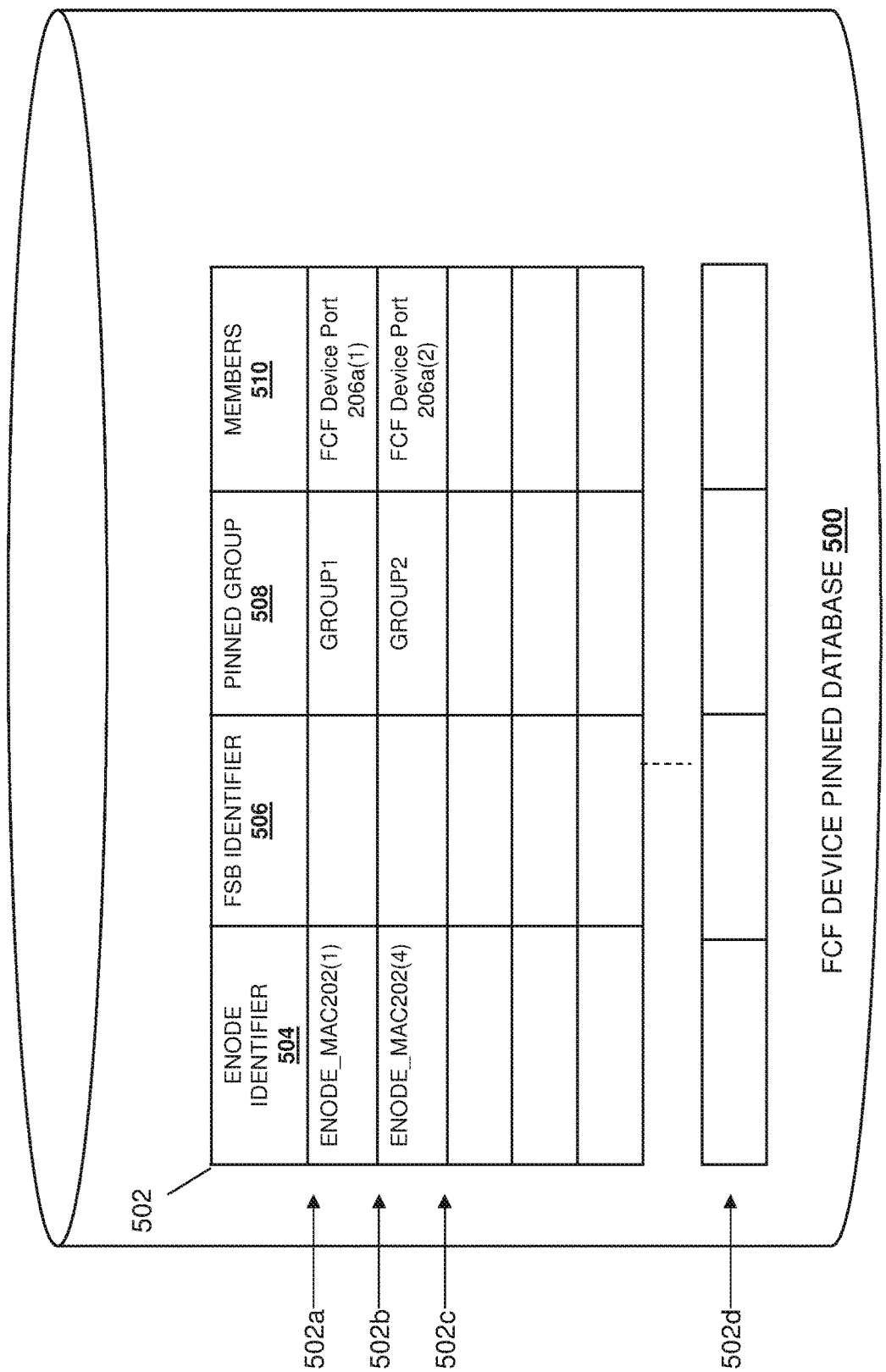
FIG. 13 is a schematic view illustrating an embodiment of information being provided in the FCF device pinned database of FIG. 5 for the FCoE pinning system of FIG. 2A during the method of FIG. 8.

In an embodiment of block 806 and with reference to the FCF device pinned database 500 of FIGS. 10B, 11B, 12B, and 13, the FCoE pinning engine 405 may generate one or more pinning tables. For example, the FCF device 206a of the FCoE pinning system 200a in FIG. 2A may maintain an FCF device pinning table 502 in the FCF device pinned database 500 of FIG. 13 that provides the pinned group members of FCF device ports. For example, the FCF device pinning table entry 502a of the FCF device pinning table 502 of FIG. 13 illustrates how the FCoE pinning engine 405 may operate to pin the FCF device port 206a(1) with FCoE traffic by associating the ENode identifier of the server port 202(1) ("ENODE_MAC202(1)") of the server device 202 with the FCF device port 206a(1) ("FCF Device Port 206a(1)") through which the FCF device 206a received the server message that provided the ENode identifier. Similarly, because there are two links 210a and 210b that are included in the aggregated interface 212, the FCF device pinning table entry 502b of the FCF device pinning table 502 illustrates how the FCoE pinning engine 405 may operate to pin the FCF device port 206a(2) with FCoE traffic by associating the ENode identifier of the server port 202(2) ("ENODE_MAC202(2)") of the server device 202 with the FCF device port 206a(2) ("FCF Device Port 206a(2)") through which the FCF device 206a received the server message that provided the ENode identifier. Because there are no FSBs between the server device 202 and the FCF device 206a in the FCoE pinning system 200a, the FSB identifier column 506 is left without an entry.

However, in various embodiments and with reference to the FCoE pinning systems 202b-202d of FIGS. 2B-2D, the FCF device 206a may associate each FSB identifier, which is received in the FSB pinned notification from the FSB 204a, with the FCF device port on which the FSB pinned notification was received. Each FSB identifier may be associated with the pinned group that the associated FCF device port is a member. In various embodiments, the FCF device 206 may associate each FSB identifier that is received in the FSB pinned notification from the FSB 204a with the FCF device port on which the FSB pinned notification was received prior to the pinned group being formed that associates the ENode identifier with the FCF device port. Thus, the association of the FSB identifier with the FCF device port may form a group that is pinned for FCoE traffic. FCF device ports that receive FSB pinned notifications that include the same FSB identifier may be included in the same group.

Figure 10B:
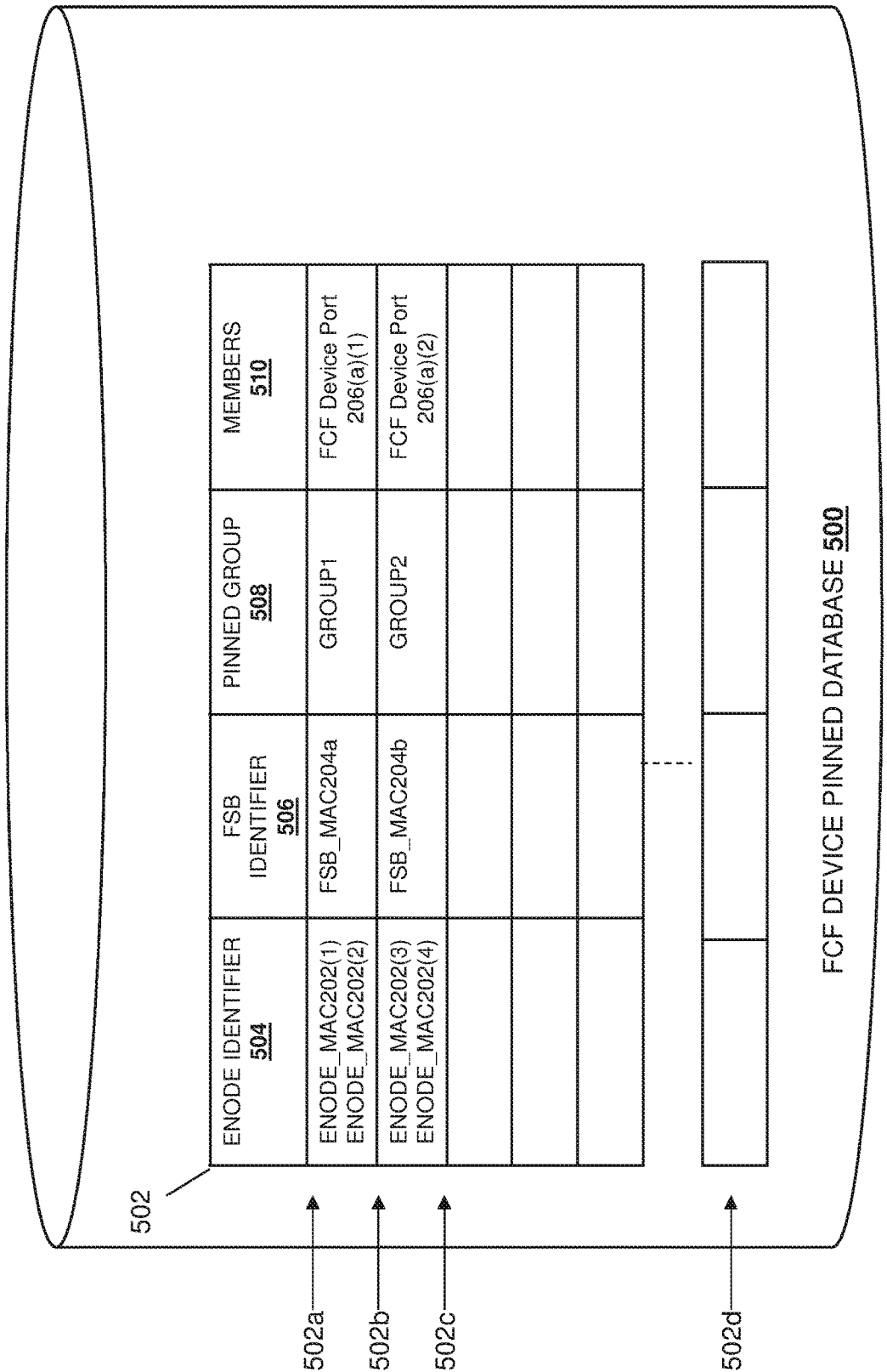
FIG. 10B is a schematic view illustrating an embodiment of information being provided in the FCF device pinned database of FIG. 5 for the FCoE pinning system of FIG. 2B during the method of FIG. 8.

For example, the FCF device 206a of the FCoE pinning system 200b of FIG. 2B may maintain an FCF device pinning table 502 in the FCF device pinned database 500 of FIG. 10B that provides the pinned group members of the FCF device ports on the FCF device 206a. The FCF device pinning table entry 502a of the FCF device pinning table 502 illustrates how the FCoE pinning engine 405 may operate to pin the FCF device port 206a(1) with FCoE traffic by associating the FCF device port 206a(1) ("FCF Device Port 206a(1)") of FCF device 206a with the FSB identifier ("FSB_MAC204a") of FSB 204a, with the ENode identifier ("ENODE_MAC202(1)") of server port 202(1), and with the ENode identifier ("ENODE_MAC202(2)") of the server port 202(2). Similarly, the FCF device pinning table entry 502b of the FCF device pinning table 502 illustrates how the FCoE pinning engine 405 may operate to pin the FCF device port 206a(2) with FCoE traffic by associating the FCF device port 206a(2) ("FCF Device Port 206a(2)") of FCF device 206a with the FSB identifier ("FSB_MAC204b") of FSB 204b, with the ENode identifier ("ENODE_MAC202(3)") of server port 202(3), and with the ENode identifier ("ENODE_MAC202(4)") of the server port 202(4).

In another example, the FCF device 206a of the FCoE pinning system 200c in FIG. 2C may maintain an FCF device pinning table 502 in the FCF device pinned database 500 in FIG. 11B that provides the pinned group members of the FCF device ports on the FCF device 206a. For example, the FCF device pinning table entry 502a of the FCF device pinning table 502 illustrates how the FCoE pinning engine 405 may operate to pin the FCF device port 206a(1) with FCoE traffic by associating the FCF device port 206a(1) ("FCF Device Port 206a(1)") of FCF device 206a with the FSB identifier ("FSB_MAC204a") of FSB 204a, and with the ENode identifier ("ENODE_MAC202(1)") of server port 202(1). Similarly, the FCF device pinning table entry 502b of the FCF device pinning table 502 illustrates how the FCoE pinning engine 405 may operate to pin the FCF device port 206a(2) with FCoE traffic by associating the FCF device port 206a(2) ("FCF Device Port 206a(2)") of FCF device 206a with the FSB identifier ("FSB_MAC204b") of FSB 204b, and with the ENode identifier ("ENODE_MAC202(4)") of server port 202(4).

In another example, the FCF device 206a of the FCoE pinning system 200d in FIG. 2D may maintain an FCF device pinning table 502 in the FCF device pinned database 500 of FIG. 12B that provides the pinned group members of the FCF device ports of the FCF device 206a. For example, the FCF device pinning table entry 502a of the FCF device pinning table 502 illustrates how the FCoE pinning engine 405 may operate to pin the FCF device port 206a(1) and the FCF device port 206a(2) with FCoE traffic by associating the FCF device port 206a(1) ("FCF Device Port 206a(1)") and the FCF device port 206a(2) ("FCF Device Port 206a(2)") of FCF device 206a with the FSB identifier ("FSB_MAC204a") of FSB 204a, and with the ENode identifier ("ENODE_MAC202(1)") of server port 202(1).

The method 800 then proceeds to block 808 where FCoE traffic is provided on the pinned FCF device ports. In an embodiment of block 808, the FCF device 206a may provide an FCF response message in response to the server message received at block 804. For example, the FCF response message may include an FLOGI accept message (e.g., a FLOGI LS_ACC), which may be sent in response to the server message that included the FLOGI 908 in order to complete a fabric login. The FCF device 206a may send the FCF response message on the FCF device port(s) that are members of a pinned group. As illustrated in FIG. 9A and with reference to the FCoE pinning system 200a, the FCF device 206a may send the FCF response message 912 to the server device 202. As illustrated in FIG. 9B and with reference to the FCoE pinning systems 200b-200d of FIGS. 2B-2D, the FCF device 206a may send the FCF response message 912 to the server device 202 via the FSB 204a, which forwards the FCF response message as a forwarded FCF response message 914 to the server device 202.

In various embodiments, once fabric login is completed, FCoE traffic may now be provided through the FCF device port(s) and the FSB ports that are pinned for FCoE traffic. The FSB 204*a* and/or the FCF device 206*a* may reference the respective FSB pinned database 606 and FCF device pinned database 406 to determine which ports of the FSB 204*a* and/or the FCF device 206*a* in the aggregated interface are pinned for FCoE traffic, or otherwise support routing of FCoE traffic. If multiple links in a pinned group exist, the FCoE traffic may be load balanced between the links via, for example, hashing operations performed on the FCoE traffic. If a link that is included in a pinned group of the FCF device 206*a* goes down, the FCoE pinning engine 405 in the FCF device 206*a* may remove the port or downstream device identifier from the pinned group in the FCF device pinned database 406. Similarly, if a link that is included in a pinned group of the FSB 204*a* goes down, the FCoE pinning engine 605 of the FSB 204*a* may remove the FSB port, downlink (e.g., ENode), and/or uplink (e.g., FCF device) device identifier from the pinned group in the FSB pinned database 606. Alternatively, if a link is added to an aggregated interface, the FCoE pinning engine 405 of the FCF device 206*a* may add the port or downstream device identifier to the pinned group, or generate a new pinned group in the FCF device pinned database 406 according to the method 800. Similarly, the FCoE pinning engine 605 of the FSB 204*a* may add the FSB port, downlink, and/or uplink device identifier to the pinned group, or generate a new pinned group in the FCF device pinned database 406 according to the method 800.

Thus, systems and methods have been presented that provide for FCoE pinning in a manner that allows more than one FSB port or FCF device port in an aggregated interface to be automatically pinned for FCoE traffic. An FCF device and, in some embodiments, an FSB may maintain pinning tables where multiple links may be pinned as groups and referenced when providing FCoE traffic. Thus, the systems and methods of the present disclosure solve the issues with conventional pinning systems that limit the number of CNA ports used for FCoE traffic (i.e., to one port per SAN fabric) when those CNA ports are members of an aggregated interface. For example, specific embodiments the pinning tables of the present disclosure allow FCoE traffic to be provided on each CNA port in a four port CNA. Furthermore, by pinning multiple links between an ENode and an FCF device for FCoE traffic, the systems and methods of the present disclosure reduce latency associated with FCoE traffic, free bandwidth on the links between the FCF device and the ENode, and relieve congestion on those links.

Figure 14:
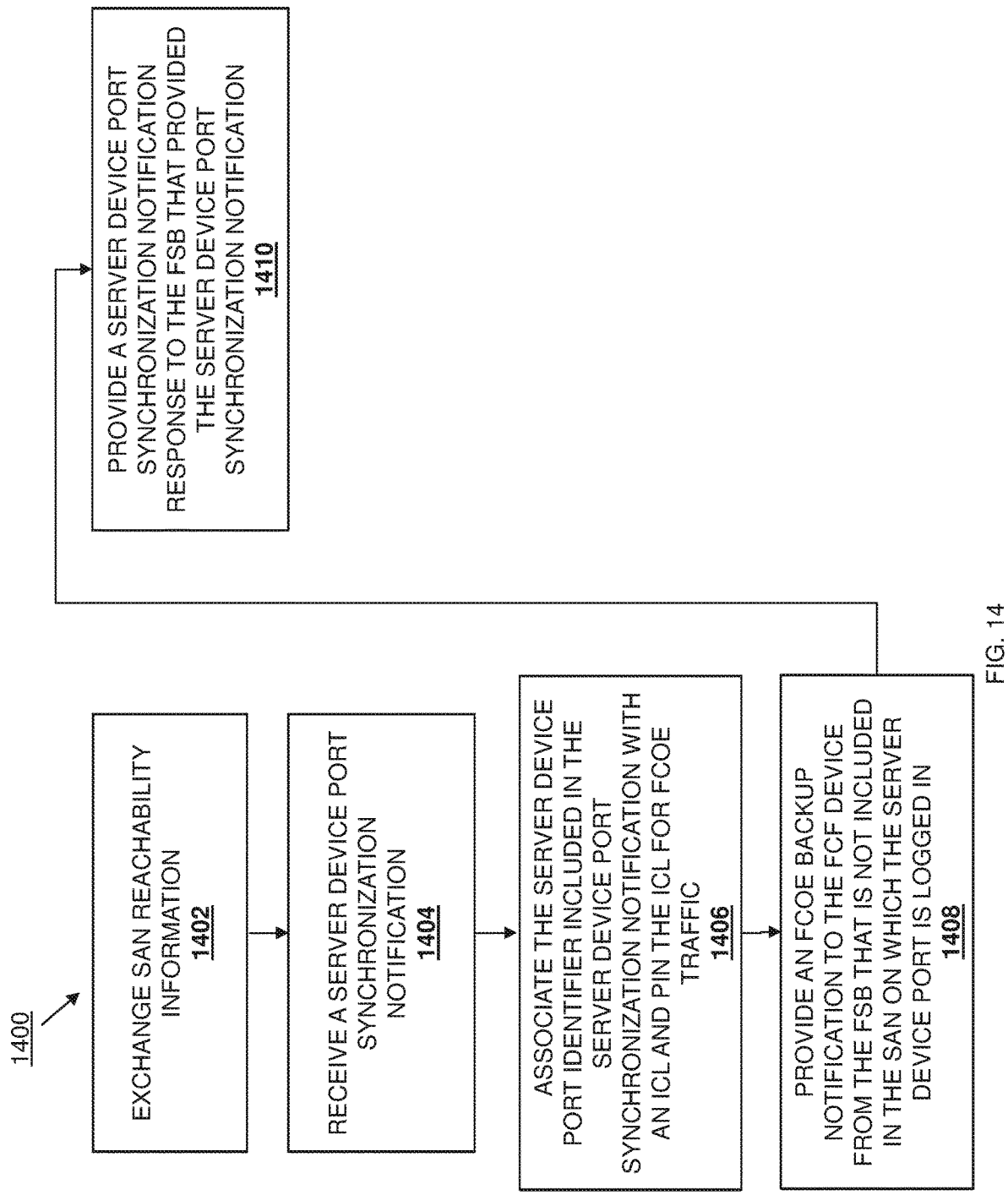
FIG. 14 is a flow chart illustrating an embodiment of a method for providing an FCoE backup path.

Referring now to FIG. 14, an embodiment of a method 1400 for providing an FCoE backup path is illustrated. As discussed above, in conventional systems that support FCoE and that utilize an aggregation protocol (e.g., VLT) that aggregates links between an ENode, an FCF device, and an FSB in order to provide an aggregated interface (e.g., a port channel, also referred to as a VLT LAG), only member ports of an aggregated interface that are connected to the same device as an FCoE pinned port can be used to provide a backup link for FCoE traffic in the event that the link provided by the FCoE pinned port goes down, fails, or otherwise becomes unavailable. The systems and methods of the present disclosure provide an FCoE pinning system with a backup path for FCoE traffic that does not include a member port of the aggregated interface between FCoE pinned ports. Rather, the systems and methods of the present disclosure utilize ICLs (e.g., VLTi's) between peer FSBs as backup paths for such FCoE traffic. ICLs between FSBs are typically used only for control traffic (and not FCoE traffic) because, in conventional SAN fabrics provided between an Enode, an FSB, and an FCF, FCoE traffic is provided on a point-to-point basis, and no connections exist between SAN fabrics when an aggregation protocol is utilized.

In various embodiments of the present disclosure, during SAN discovery, the FSB of the present disclosure will exchange, via an ICL, FCF device identifiers of the FCF devices that the FSB can reach with other FSBs. Using the exchanged identifiers, the FSB may maintain an FSB SAN reachability table that identifies the FCF devices that its peer FSBs can reach. After a server device port (e.g., an ENode) logs in to a particular SAN, information about that server device port will be exchanged by the FSB provided in the SAN with FSBs that are not provided in the SAN but that have connectivity to the FCF device that is provided in the SAN to which the server device port is logged in. Access control lists on the ports of the ICL may be created by the FSB to permit FCoE traffic flow from the server device port on the ICL. The ICL and the member ports that provide the ICL on the peer FSB device may be pinned for FCoE traffic, and the peer FSB device may provide a notification to the FCF device to pin the interface between the peer FSB device and the FCF device as a backup pin group for FCoE traffic originating from the server device port. Thus, the alternative FCoE backup paths provided over the ICLs using the FCoE pinning tables and the FCoE pinning discussed herein provide an alternative FCoE traffic path through devices that do not belong to the same SAN as the FCoE traffic, while also providing for the creation of a backup path for FCoE traffic without a conventional fabric login, and providing for the automatic detection and configuration of the FCoE traffic backup paths, as well as providing other benefits that will be apparent to one of skill in the art in possession of the present disclosure when providing FCoE traffic through a backup path via ICLs.

The method 1400 begins at block 1402 where SAN reachability information is exchanged between FSBs in an FCoE pinning system. In an embodiment of block 1402, the FSB 204*a* and the FSB 204*b* of the FCoE pinning systems 200*b*-200*d* of FIGS. 2B-2D may exchange SAN reachability information with each other. For example, the FSB 204*a* may provide SAN reachability information to the FSB 204*b* via an inter-chassis link (ICL) (e.g., the link 214*e*). The SAN reachability information may be provided in a SAN reachability synchronization message, and may include an FCF device identifier for each FCF device to which the FSB 204*a* is connected, and an FSB identifier (e.g., an FSB MAC address) of the FSB 204*a*. For example, the FSB 204*a* may provide FCF device identifiers (e.g., FCF device MAC addresses) included in FCF device advertisements provided by the FCF devices 206*a* and/or FCF device 206*b* discussed above in block 802 of method 800 of FIG. 8. Similarly, the FSB 204*a* may receive SAN reachability information from the FSB 204*b* via the link 214*e* to which the FSB 204*b* is connected. The SAN reachability information provided by the FSB 204*b* may be included an FCF device identifier for each FCF device to which the FSB 204*b* is connected, and an FSB identifier for the FSB 204*b*.

The FSB 204*a* may generate the FSB peer SAN reachability table 722 using the SAN reachability information provided by the FSB 204*b*. Similarly, the FSB 204*b* may generate the FSB peer SAN reachability table 722 using the SAN reachability information provided by the FSB 204*a*. The FSB peer SAN reachability table 722 may be generated subsequent to the FCF device advertisements being received at the FSBs 204*a* and 204*b*, and prior to any server device ports being logged in to an FCF device through the FSB 204*a* and/or the FSB 204*b*. However, one of skill in the art in possession of the present disclosure will recognize that the FSB peer SAN reachability table 722 may be updated and/or added to at any time during a SAN discovery process and/or a SAN login process. For example, the FSB peer SAN reachability table 722 may be updated in response to various FCF devices or FSBs being added to, or removed from, the FCoE pinning systems 200*b*-200*d*. For example, any update in the FSB pinning able 702 for an FCF device may trigger SAN reachability synchronization. As such, the FSB peer SAN reachability table 722 in the FSB 204*a* associates a FSB identifier for the FSB 204*b* with the FCF device identifiers of the FCF device to which the FSB 204 is connected.

Figure 15:
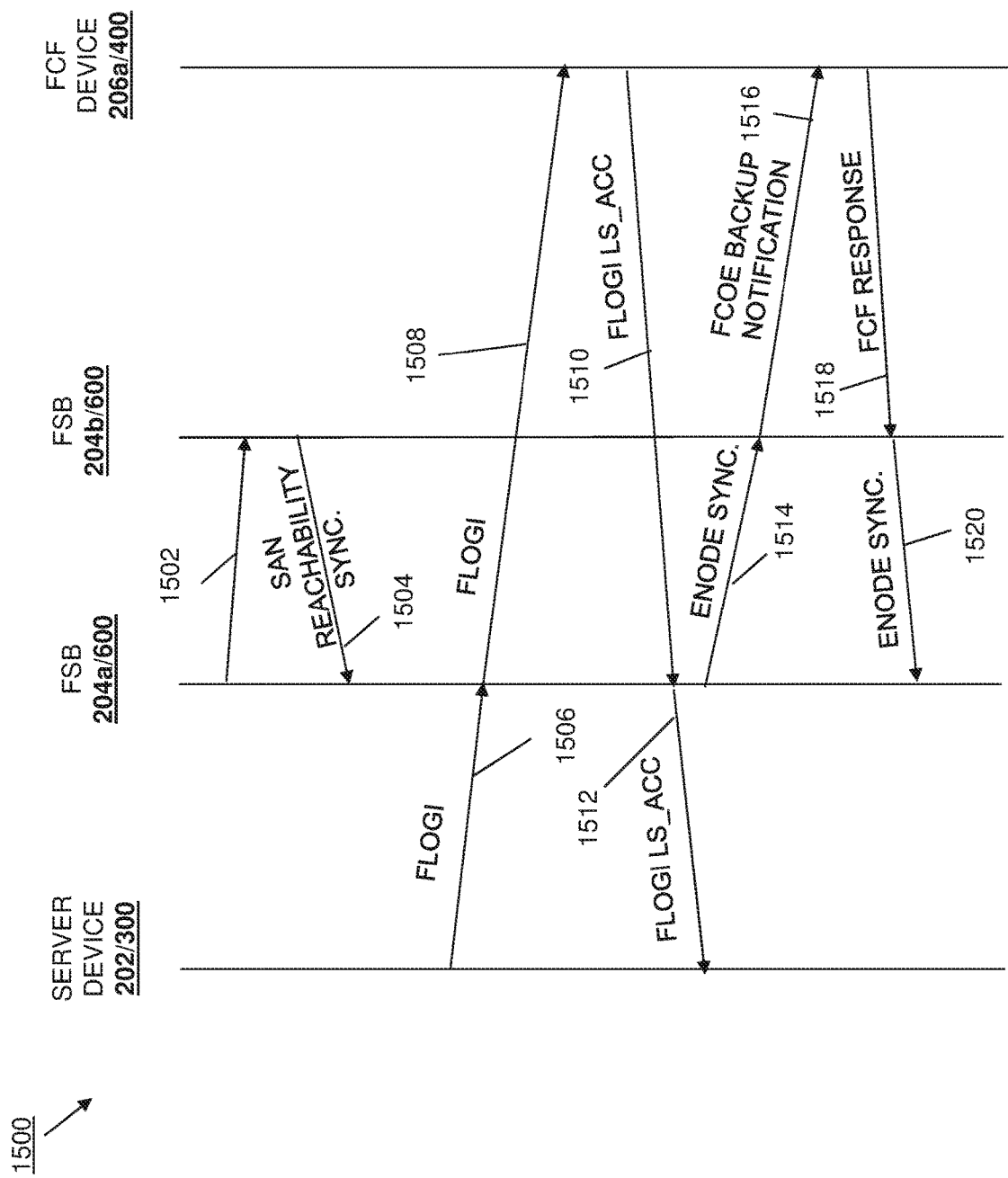
FIG. 15 is a diagram illustrating an embodiment of communications in generating an FCoE backup path during the method of FIG. 14.

Referring now to FIG. 15, an example FCoE backup path communication diagram 1500 illustrates communications between each of the server device 202/300 and the FSB 204*a*/600, the FSB 204*a*/600 and the FCF device 206*a*/400, the FSB 204*b*/600 and the FCF device 206*a*/400, and the FSB 204*a*/600 and the FSB 204*b*/600 during the method 1400. The FCoE backup path communication diagram 1500 is discussed with reference to the FCoE pinning systems 200*b*-200*d* of FIGS. 2B-2D. In the illustrated example, the FSB 204*a* may provide to the FSB 204*b* a SAN reachability synchronization message 1502 that includes SAN reachability information for the FSB 204*a*. Similarly, the FSB 204*a* may receive, from the FSB 204*b*, a SAN reachability synchronization message 1504 that includes SAN reachability information for the FSB 204*b*. In various embodiments, the exchange of SAN reachability information may be performed after the discovery by each FSB 204*a* and FSB 204*b* of the FCF device to which each is connected (e.g., subsequent to receiving the MDA 902 of FIG. 9B), and prior to one or more server device ports (e.g., an FCoE node (Endoe)) being logged in to an FCF device through an FSB (e.g., prior to receiving the FLOGI 908 of FIG. 9B).

Figure 16A:
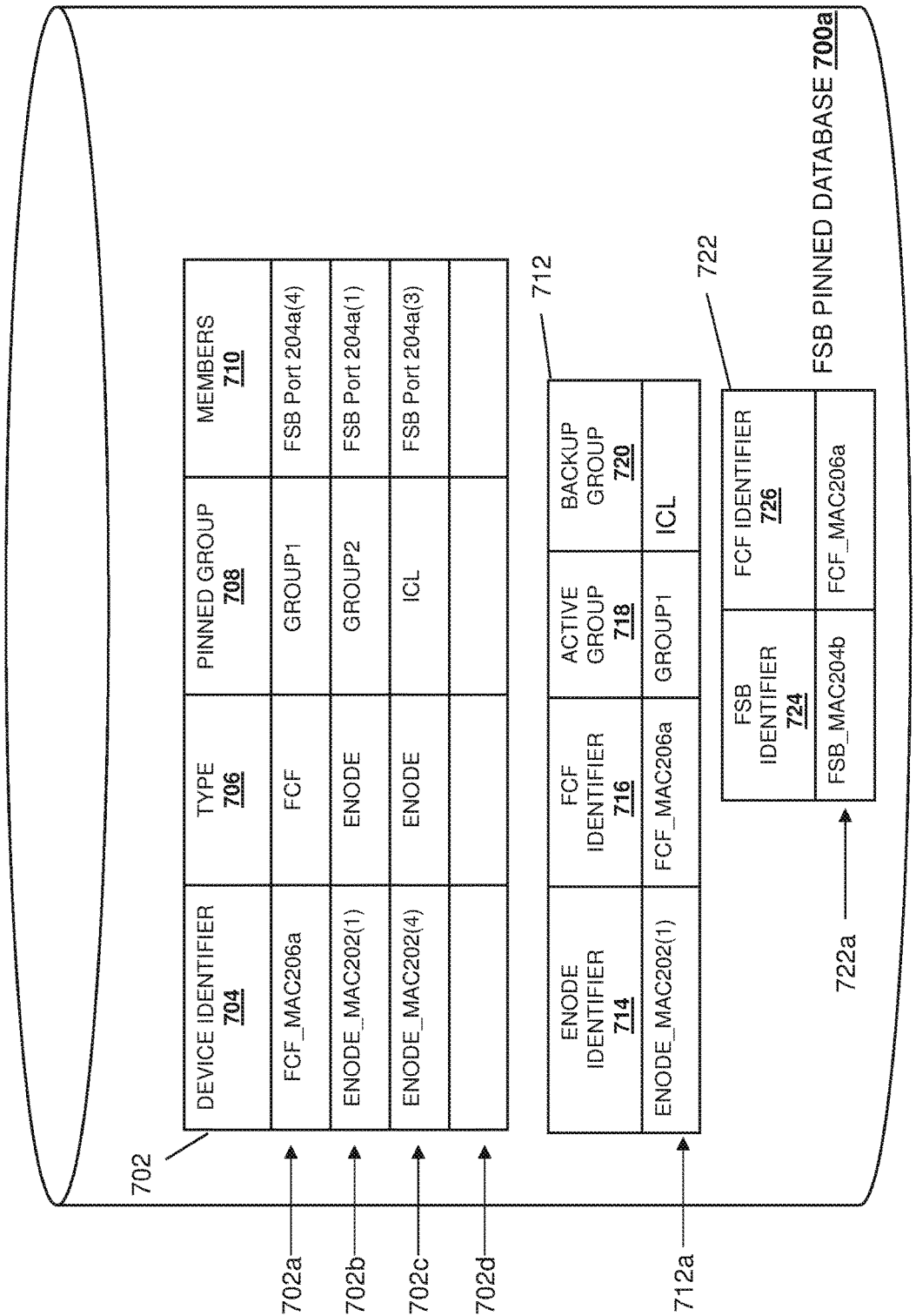
FIG. 16A is a schematic view illustrating an embodiment of information provided in the FSB pinned database of FIG. 7 included in a first FSB in the FCoE pinning system of FIG. 2C during the method of FIG. 14.
Figure 17A:
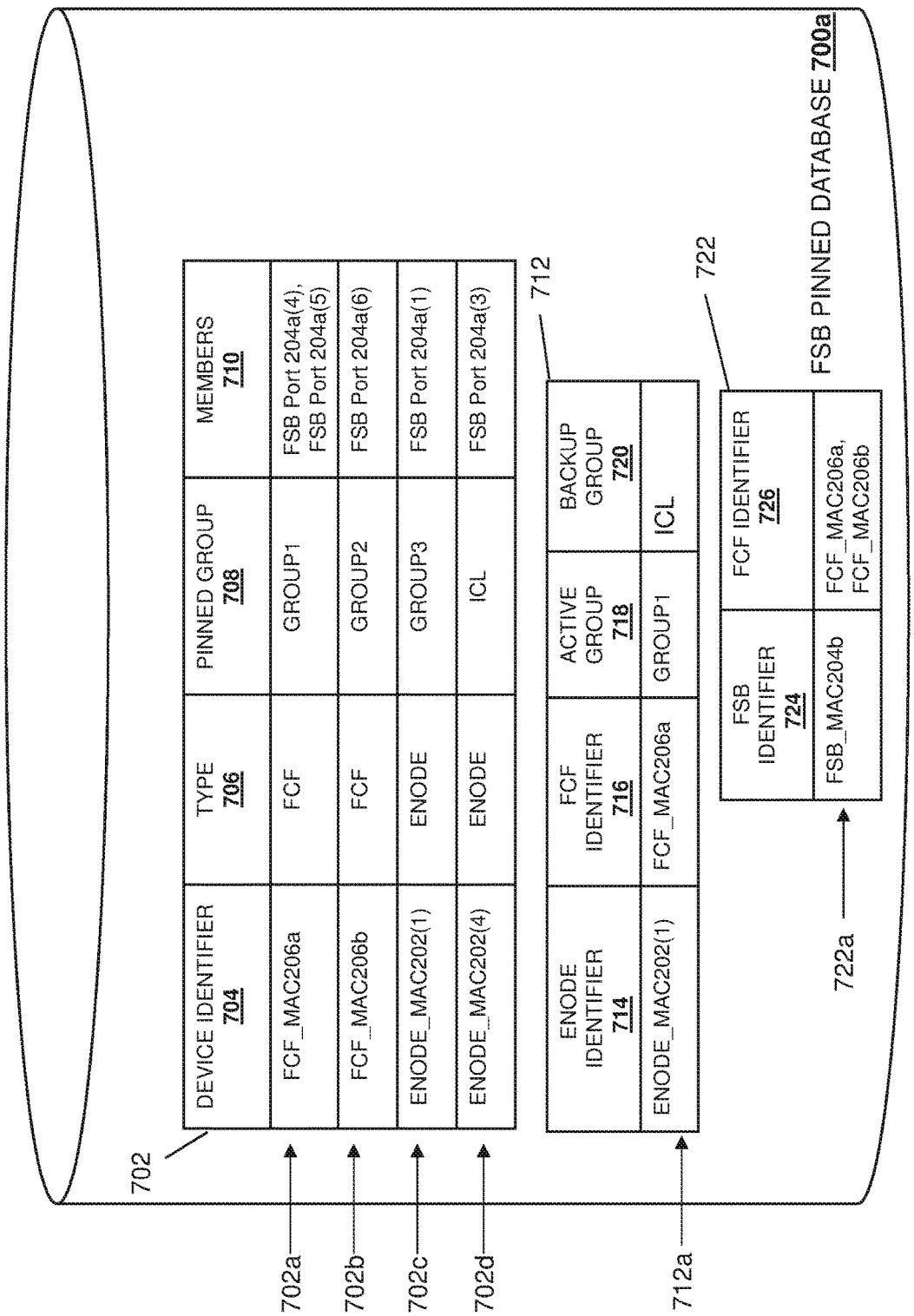
FIG. 17A is a schematic view illustrating an embodiment of information provided in the FSB pinned database of FIG. 7 included in a first FSB in the FCoE pinning system of FIG. 2D during the method of FIG. 14.

In an embodiment of block 1402, and with reference to the FSB pinned database 700*a* of FIGS. 16A and 17A, the FCoE pinning engine 605 of the FSB 204*a* may generate the FSB peer SAN reachability table 722. For example, the FSB 204*a* of the FCoE pinning system 200*c* in FIG. 2C may maintain the FSB peer SAN reachability table 722 in the FSB pinned database 700*a* of FIG. 16A that provides FCF device identifiers of FCF devices to which the FSB 204*b* is connected. Because FSB 204*b* is only connected to the FCF device 206*a*, the FSB peer SAN reachability table entry 722 may include an FSB identifier such as, for example, the FSB MAC address ("FSB_MAC204*b*") of the FSB 204*b*, in the FSB identifier column 724, and an FCF device identifier such as, for example, the FCF device MAC address ("FCF_MAC206*a*") of the FCF device 206*a* in the FCF device identifier column 726.

In another example, the FSB 204*a* of the FCoE pinning system 200*d* in FIG. 2D may maintain the FSB peer SAN reachability table 722 in the FSB pinned database 700*a* of FIG. 17A that provides FCF device identifiers of FCF devices to which the FSB 204*b* is connected. Because FSB 204*b* is connected to the FCF device 206*a* and the FCF device 206*b*, the FSB peer SAN reachability table entry 722 may include an FSB identifier such as, for example, the FSB MAC address ("FSB_MAC204*b*") of the FSB 204*b* in the FSB identifier column 724, and the FSB peer SAN reachability table entry 722 may include an FCF device identifier such as, for example, the FCF device MAC address ("FCF_MAC206*a*") of the FCF device 206*a* and the FCF device identifier ("FCF_MAC206*b*") of the FCF device 206*b* in the FCF device identifier column 726.

Figure 16B:
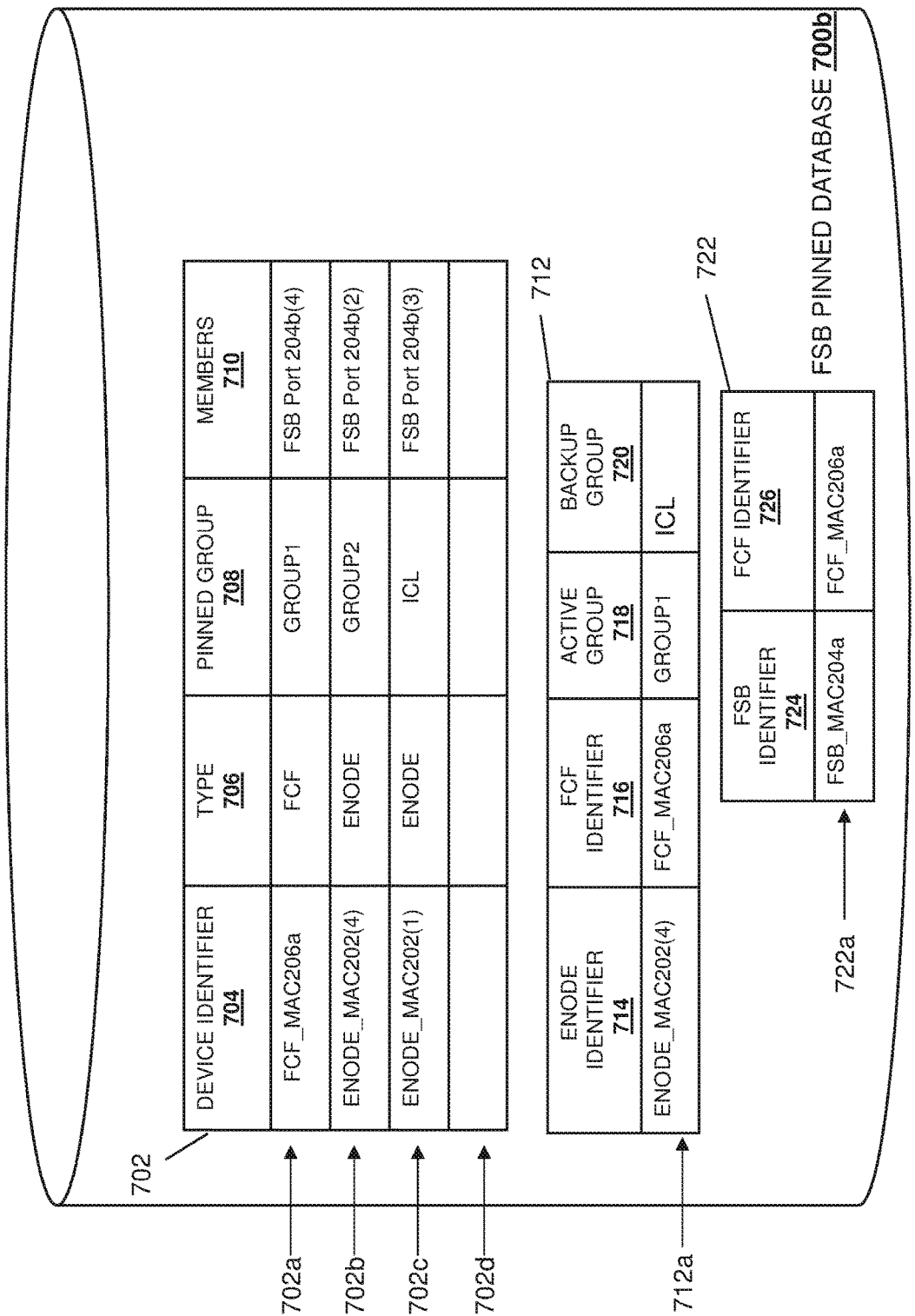
FIG. 16B is a schematic view illustrating an embodiment of information provided in the FSB pinned database of FIG. 7 included in a second FSB in the FCoE pinning system of FIG. 2C during the method of FIG. 14.
Figure 17B:
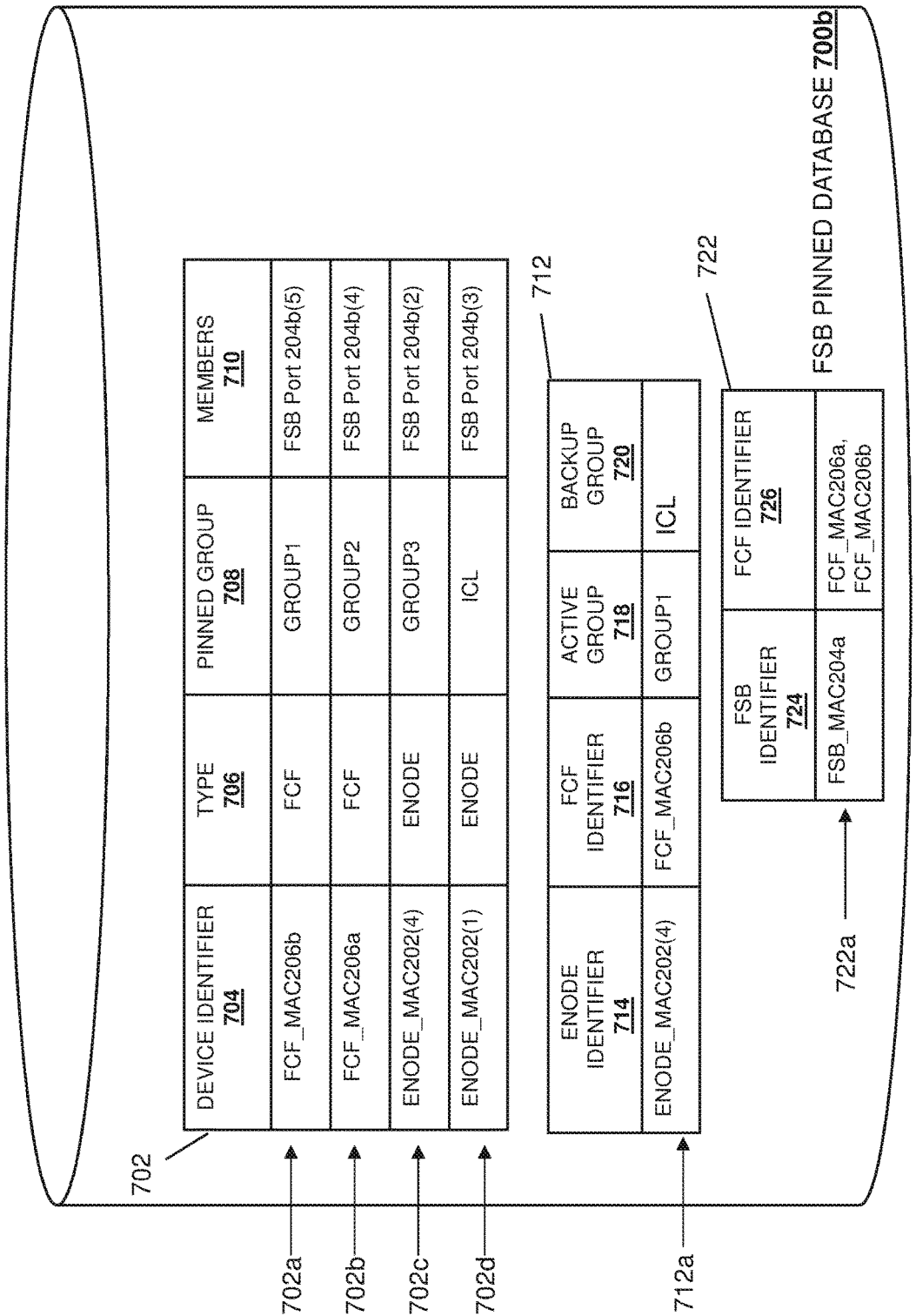
FIG. 17B is a schematic view illustrating an embodiment of information provided in the FSB pinned database of FIG. 7 included in a second FSB in the FCoE pinning system of FIG. 2D during the method of FIG. 14.

In an embodiment of block 1402, and with reference to the FSB pinned database 700*b* of FIGS. 16B and 17B, the FCoE pinning engine 605 of the FSB 204*b* may generate the FSB peer SAN reachability table 722. For example, the FSB 204*b* of the FCoE pinning system 200*c* in FIG. 2C may maintain the FSB peer SAN reachability table 722 in the FSB pinned database 700*b* of FIG. 16B that provides FCF device identifiers of FCF devices to which the FSB 204*a* is connected. Because FSB 204*a* is only connected to the FCF device 206*a*, the FSB peer SAN reachability table entry 722 may include an FSB identifier such as, for example, the FSB MAC address ("FSB_MAC204*a*") of the FSB 204*a* in the FSB identifier column 724, and an FCF device identifier such as, for example, the FCF device MAC address ("FCF_MAC206*a*") of the FCF device 206*a* in the FCF device identifier column 726.

In another example, the FSB 204*b* of the FCoE pinning system 200*d* in FIG. 2D may maintain the FSB peer SAN reachability table 722 in the FSB pinned database 700*b* of FIG. 17B that provides FCF device identifiers of FCF devices to which the FSB 204*a* is connected. Because FSB 204*a* is connected to the FCF device 206*a* and the FCF device 206*b*, the FSB peer SAN reachability table entry 722 may include thane FSB identifier such as, for example, the FSB MAC address ("FSB_MAC204*a*") of the FSB 204*a* in the FSB identifier column 724, and the FSB peer SAN reachability table entry 722 may include an FCF device identifier such as, for example, the FCF device MAC address ("FCF_MAC206*a*") of the FCF device 206*a* and the FCF device identifier ("FCF_MAC206*b*") of the FCF device 206*b* in the FCF device identifier column 726.

The method 1400 the proceeds to block 1404 where a server device port synchronization notification is received that includes an FCF device identifier for the FCF device. In an embodiment of block 1404, when a server device port (e.g., an Enode) logs into an FCF device, the FSB that is provided in the same SAN and through which the server device port is logged in at the FCF device, may provide the server device port synchronization notification (also referred to herein as an FCoE node (Enode) synchronization notification) to any FSB device that is identified in the FSB peer SAN reachability table 722 and that is connected to the same FCF device. The server device port synchronization notification may include a server device port identifier and an FCF device identifier for the FCF device with which the server device port is logged in.

Referring to the FCoE backup path communication diagram 1500 of FIG. 15, a server device port on the server device 202 may login at the FCF device 206*a* by sending a FLOGI 1506 (which may correspond with the FLOGI 908 in FIGS. 9A and 9B) to the FSB 204*a*. The FSB 204 then forwards the FLOGI 1508 to the FCF device 206*a*. The FCF device 206*a* then responds with a FLOGI LS_ACC 1510 (which in some embodiments corresponds with the FCF response message 912 from the FCF device 206*a* in FIGS. 9A and 9B) that is received by the FSB 204*a*. The FSB 204*a* then forwards the FLOGI LS_ACC 1512 to complete the SAN fabric login process for that particular server device port. In addition, in response to receiving the FLOGI LS_ACC 1510, as well as the FCF device identifier in the FLOGI LS_ACC 1510 that corresponds with an FCF device identifier in the FSB peer SAN reachability table 722, the FSB 204*a* may provide a server device port synchronization notification 1514 to the FSB that is associated with that FCF device identifier in the FSB peer SAN reachability table 722.

The server device port synchronization notification 1514 may include a server device port identifier for the server device port that is logged into the FCF device 206*a*, and the FCF device identifier of the FCF device 206*a*.

In a specific example, the server port 202(1) in the FCoE pinning system 200*c* of FIG. 2C, or in the FCoE pinning system 200*d* of FIG. 2D, may login to the FCF device 206*a* through the FSB 204*a*, which results in a FLOGI LS_ACC being received at the FSB 204*a* that includes the FCF device identifier "FCF_MAC206*a*" for FCF device 206*a*. The FSB 204*a* may compare the FCF device identifiers in the FCF device identifier column 726 of the FSB peer SAN reachability table 722 in the FSB pinned database 700*a* of FIG. 16A or 17A with the "FCF_MAC206*a*" provided in the FLOGI LS_ACC, and determine that the FSB 204*b* can reach the FCF device 206*a* based on those FCF device identifiers matching. In response, the FSB 204*a* provides the server device port synchronization notification, which includes the FCF device identifier "FCF_MAC206*a*" and the server device port identifier of server port 202(1) "Enode_MAC202(1)" to the FSB 204*b*, via the link 214*e*.

Similarly, in another specific example, the server port 202(4) of the FCoE pinning system 200*c* of FIG. 2C may login to FCF device 206*a* through the FSB 204*b*, which results in a FLOGI LS_ACC being received at the FSB 204*b* that includes the FCF device identifier "FCF_MAC206*a*" for FCF device 206*a*. The FSB 204*b* may compare the FCF device identifiers in the FCF device identifier column 726 of the FSB peer SAN reachability table 722 of the FSB pinned database 700*b* of FIG. 16B with the "FCF_MAC206*a*" provided in the FLOGI LS_ACC, and determine that the FSB 204*a* can reach the FCF device 206*a* based on those FCF device identifiers matching. In response, the FSB 204*b* provides the server device port synchronization notification, which includes the FCF device identifier "FCF_MAC206*a*" and the server device port identifier of server port 202(4) "Enode_MAC202(4)" to the FSB 204*a*, via the link 214*e*.

In yet another specific example, the server port 202(4) of the FCoE pinning system 200*d* of FIG. 2D may login to FCF device 206*b* through the FSB 204*b*, which results in a FLOGI LS_ACC being received at the FSB 204*b* that includes the FCF device identifier "FCF_MAC206*b*" for FCF device 206*b*. The FSB 204*b* may compare the FCF device identifiers in the FCF device identifier column 726 of the FSB peer SAN reachability table 722 in the FSB pinned database 700*b* of FIG. 17B with the "FCF_MAC206*b*" provided in the FLOGI LS_ACC, and determine that the FSB 204*a* can reach the FCF device 206*b* based on those FCF device identifiers matching. In response, the FSB 204*b* provides the server device port synchronization notification, which includes the FCF device identifier "FCF_MAC206*b*" and the server device port identifier of server port 202(4) (e.g., "Enode_MAC202(4)") to the FSB 204*a*, via the link 214*e*.

The method 1400 then proceeds to block 1406 where the FSB associates the server device port identifier included in the server device port synchronization notification with the ICL, and pins the ICL for FCoE traffic. In an embodiment of block 1406, and with reference to the FCoE backup path communication diagram 1500 of FIG. 15, when the FSB 204*b* receives the server device port synchronization notification from the FSB 204*a*, the FSB 204*b* will create access control lists (ACLs) on the FSB port 204*b*(3) through which the link 214*e* is established, and those ACLs may be configured to allow FCoE traffic from the server device port of the server device 202. In an embodiment, the FSB 204*b* may associate the server provider device port identifier and the FSB port identifier for the link 214*e* that provides the ICL to provide a pinned group, pin that grouping for FCoE traffic, and store the pinned group in the FSB pinning table 702.

For example, and with reference to the FSB pinned database 700*b* of FIG. 16B, the FSB 204*b* may associate the server device port identifier ("ENODE_MAC202(1)") that is included in the server device port synchronization notification with the FSB port 204*b*(3) that provides the ICL (and on which the server device port synchronization notification was received by the FSB 204*b*) as a pinned group, and pin that pinned group for FCoE traffic. As illustrated in FIG. 16B, the FCoE pinning engine 605 may generate an FSB pinning table entry 702*c* in the FSB pinning table 702, which provides an example of how the FCoE pinning engine 605 may operate to pin the FSB port 204*b*(3) with FCoE traffic by associating the ENode identifier "ENode_MAC202(4)" of the server port 202(4) on the server device 202 with the FSB port identifier ("FSB port 204*b*(3)"). While a single FSB port 204*b*(3) is illustrated as providing the link 214*e*, one of skill in the art in possession of the present disclosure will recognize that the ICL may be an aggregation of a plurality of ports to form, for example, a VLTi. As such, all member FSB ports of the ICL may be associated with the ENode identifier "ENode_MAC202(4)."

Similarly, and with reference to the FSB pinned database 700*b* of FIG. 17B, the FSB 204*b* may associate the server device port identifier ("ENODE_MAC202(1)") included in the server device port synchronization notification with the FSB port 204*b*(3) that provides the ICL (and on which the server device port synchronization notification was received by the FSB 204*b*) as a pinned group, and pin that pinned group for FCoE traffic. As illustrated in FIG. 17B, the FCoE pinning engine 605 may generate an FSB pinning table entry 702*d* in the FSB pinning table 702, which provides an example of how the FCoE pinning engine 605 may operate to pin the FSB port 204*b*(3) with FCoE traffic by associating the ENode identifier "ENode_MAC202(1)" of the server port 202(1) on the server device 202 with the FSB port "FSB port 204*b*(3)".

In yet another example, and with reference to the FSB pinned database 700*a* of FIG. 16A, the FSB 204*a* may associate the server device port identifier ("ENODE_MAC202(4)") included in the server device port synchronization notification received from FSB 204*b* when the server port 202(4) logs into FCF device 206*a*, with the FSB port 204*a*(3) that provides the ICL (and on which the server device port synchronization notification was received by the FSB 204*a*.) The association of the server device port identifier "ENODE_MAC202(4)" and the FSB port 204*a*(3) may be grouped and pinned as a pinned group for FCoE traffic. As illustrated in FIG. 16A, the FCoE pinning engine 605 may generate an FSB pinning table entry 702*c* on the FSB pinning table 702, which provides an example of how the FCoE pinning engine 605 may operate to pin the FSB port 204*a*(3) with FCoE traffic by associating the ENode identifier "ENode_MAC202(4)" of the server port 202(4) on the server device 202 with the FSB port "FSB port 204*a*(3)".

In yet another example, and with reference to the FSB pinned database 700*a* of FIG. 17A, the FSB 204*a* may associate the server device port identifier ("ENODE_MAC202(4)") included in the server device port synchronization notification received from FSB 204*b* when the server port 202(4) logs into FCF device 206*a*, with the FSB port 204*a*(3) that provides the ICL (and on which the server device port synchronization notification was received by the FSB 204*a*.) The association of the server device port identifier "ENODE_MAC202(4)" and the FSB port 204a(3) may be grouped and pinned as a pinned group for FCoE traffic. As illustrated in FIG. 17A, the FCoE pinning engine 605 may generate an FSB pinning table entry 702d in the FSB pinning table 702, which provides an example of how the FCoE pinning engine 605 may operate to pin the FSB port 204a(3) with FCoE traffic by associating the ENode identifier "ENode_MAC202(4)" of the server port 202(4) on the server device 202 with the FSB port "FSB port 204a(3)".

The method 1400 then proceeds to block 1408 where an FCoE backup notification is provided to the FCF device from the FSB that is not included in the SAN that the server device port is logged into. In an embodiment of block 1408 and with reference to the FCoE backup path communication diagram 1500 of FIG. 15, when the FSB 204b receives the server device port synchronization notification from the FSB 204a, the FSB 204b will provide an FCoE backup notification 1516 to the FCF device identified in the server device port synchronization notification. The FCoE backup notification may include a special FIP descriptor that indicates that FCoE traffic from the server device port should be received at the FCF device port on which the FCoE backup notification is received from the FSB 204b. The FCoE pinning engine 405 of the FCF device 206a may then generate the FCF device FCoE backup table 512 that indicates which pinned groups in the FCF device pinning table 502 are active groups for FCoE traffic for a particular server device port, and which pinned group(s) are backup groups.

Figure 16C:
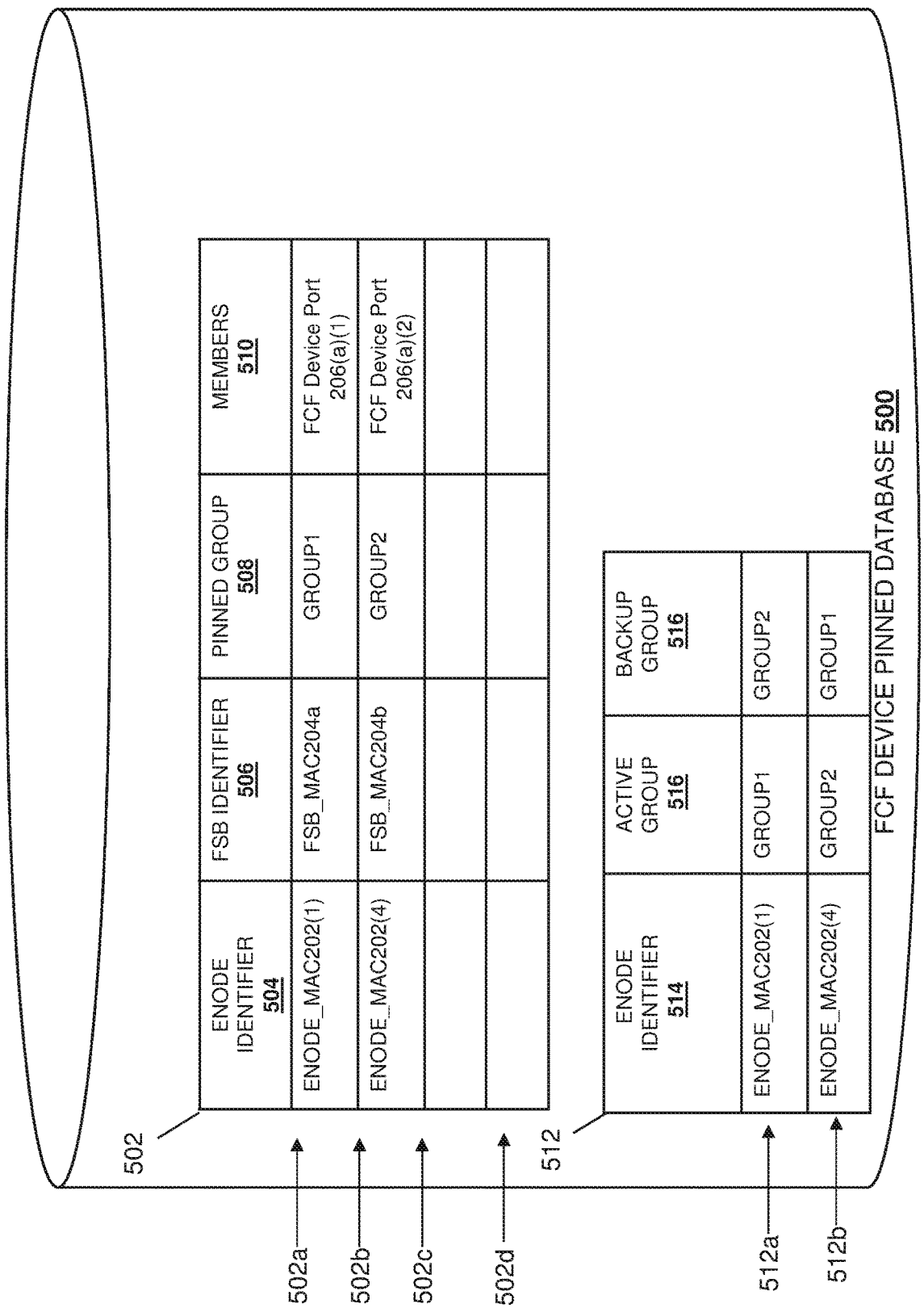
FIG. 16C is a schematic view illustrating an embodiment of information provided in the FCF device pinned database of FIG. 5 included in the FCF device in the FCoE pinning system of FIG. 2C during the method of FIG. 14.

For example, and with reference to the FCF device pinned database 500 of FIG. 16C and the FCoE pinning system 200c of FIG. 2C, the FCF device 206a may generate the FCF device FCoE backup table 512. The FCF device 206a may receive an FCoE backup notification through the FCF device port 206a(2) from the FSB port 204b(4), and the FCoE backup notification may include the server device port identifier of the server port 202(1), which indicates to the FCF device 206a that the FCF device port 206a(2) can handle backup FCoE traffic originating from server port 202(1) and received from the FSB 204b. As indicated by the FCF device FCoE backup table entry 512a, the server device port identifier "ENODE_MAC202(1)" has an active group of "Group 1" that is identified in the FCF device pinning table entry 502a, and a backup group of "Group 2" that is identified in the FCF device pinning table entry 502b.

Similarly, the FCF device 206a may receive an FCoE backup notification through the FCF device port 206a(1) from the FSB port 204a(4) and the FCoE backup notification may include the server device port identifier of server port 202(4), which indicates to the FCF device 206a that the FCF device port 206a(1) can handle backup FCoE traffic originating from server port 202(4) and received from the FSB 204a. As indicated in FCF device FCoE backup table entry 512b, the server device port identifier "ENODE_MAC202(4)" has an active group of "Group 2" that is identified in the FCF device pinning table entry 502b, and a backup group of "Group 1" that is identified in the FCF device pinning table entry 502a.

Figure 17C:
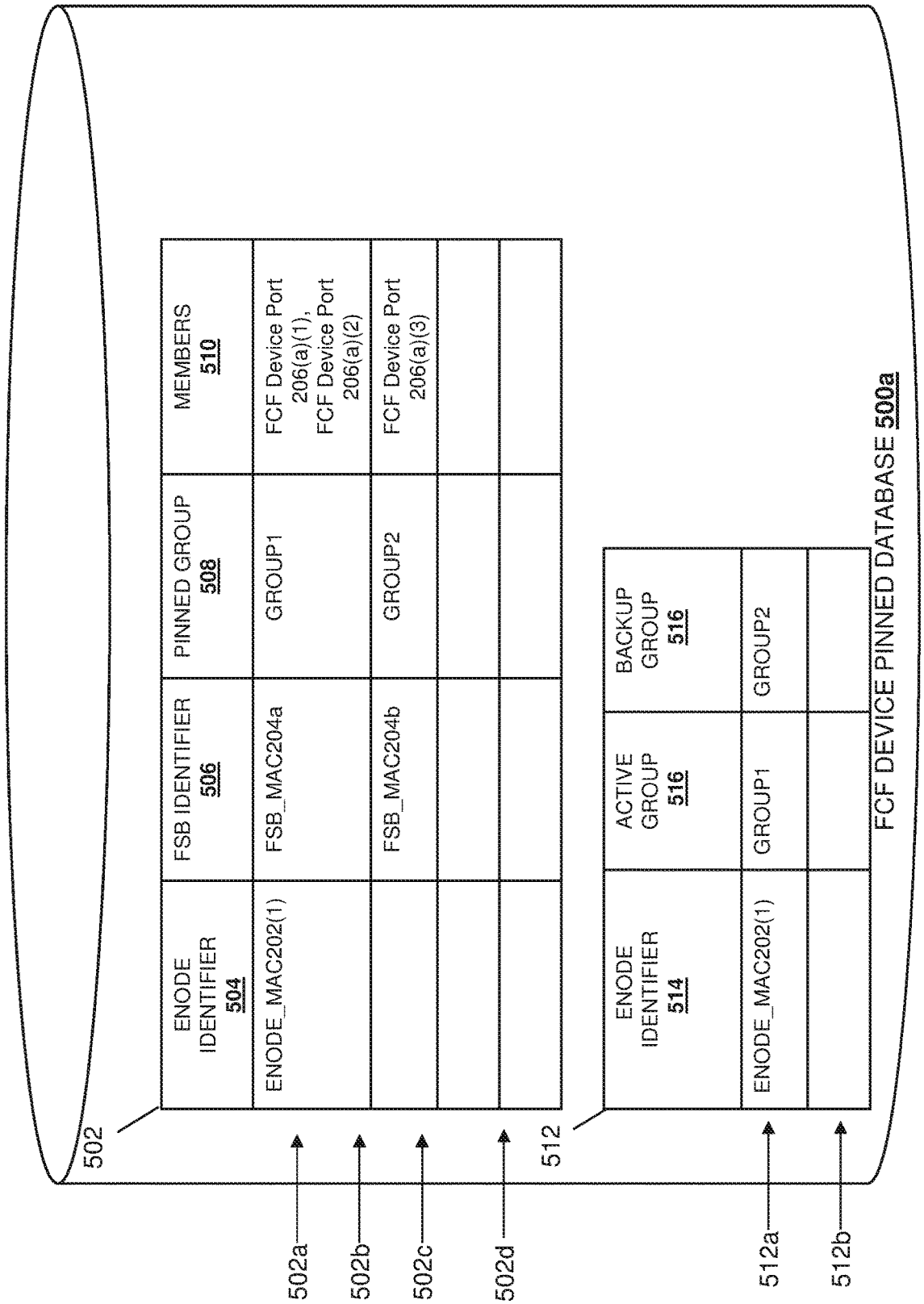
FIG. 17C is a schematic view illustrating an embodiment of information provided in the FCF device pinned database of FIG. 5 included in a first FCF device in the FCoE pinning system of FIG. 2D during the method of FIG. 14.

In yet another example and with reference to the FCF device pinned database 500a of FIG. 17C and the FCoE pinning system 200d of FIG. 2D, the FCF device 206a may generate the FCF device FCoE backup table 512. The FCF device 206a may receive an FCoE backup notification through the FCF device port 206a(3) from the FSB port 204b(4), and the FCoE backup notification may include the server device port identifier of server port 202(1), which indicates to the FCF device 206a that the FCF device port 206a(3) can handle backup FCoE traffic originating from the server port 202(1) and received from the FSB 204b. As indicated in FCF device FCoE backup table entry 512a, the server device port identifier "ENODE_MAC202(1)" has an active group of "Group 1" that is identified in the FCF device pinning table entry 502a, and a backup group of "Group 2" that is identified in the FCF device pinning table entry 502b.

Figure 17D:
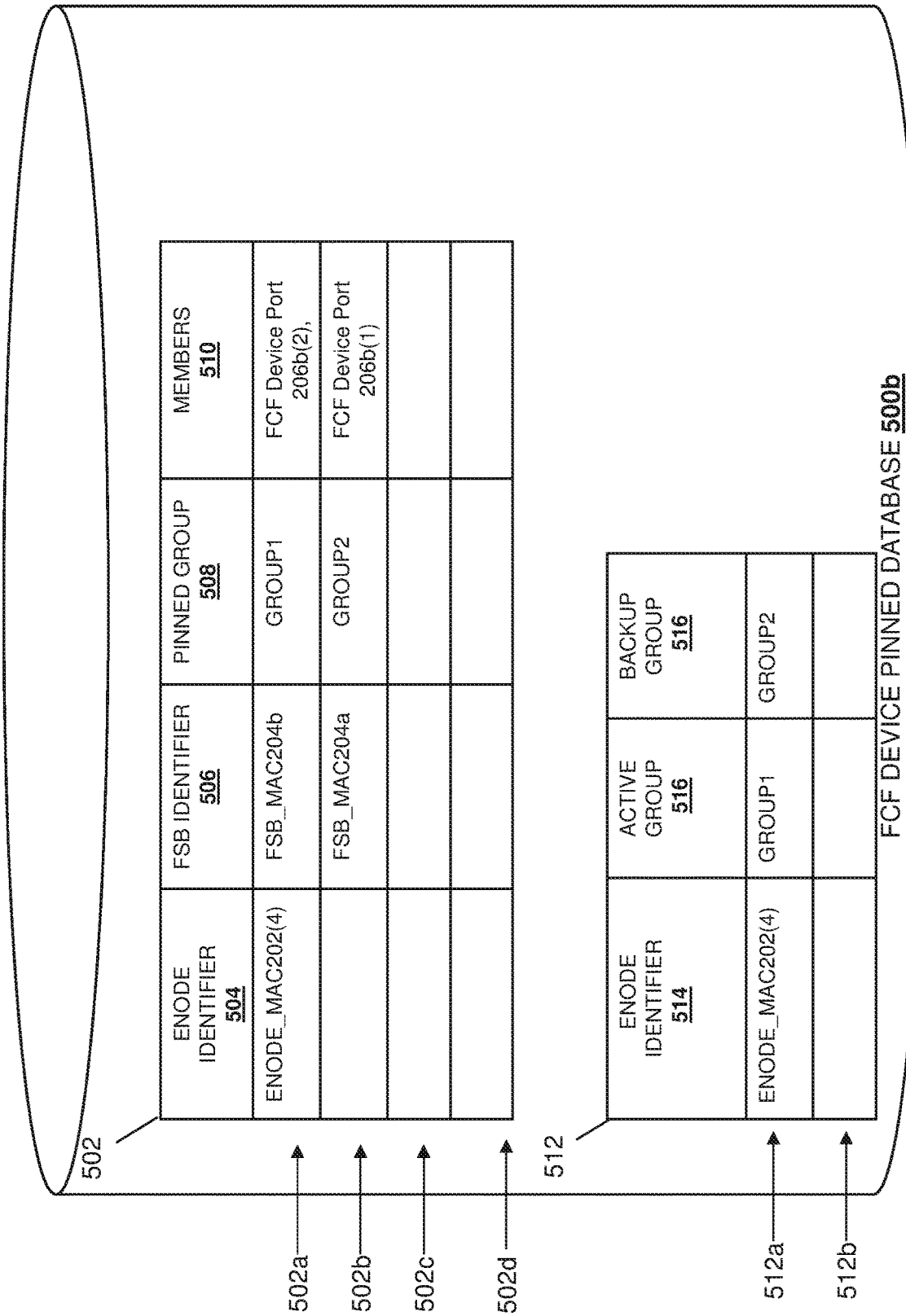
FIG. 17D is a schematic view illustrating an embodiment of information provided in the FCF device pinned database of FIG. 5 included in a second FCF device in the FCoE pinning system of FIG. 2D during the method of FIG. 14.

In yet another example and with reference to the FCF device pinned database 500b of FIG. 17D and the FCoE pinning system 200d of FIG. 2D, the FCF device 206b may generate the FCF device FCoE backup table 512. The FCF device 206b may receive an FCoE backup notification through the FCF device port 206b(3) from the FSB port 204a(5), and the FCoE backup notification may include the server device port identifier of server port 202(4), which indicates to the FCF device 206b that the FCF device port 206b(3) can handle FCoE traffic originating from the server port 202(4) and received from the FSB 204a. As indicated in FCF device FCoE backup table entry 512a, the server device port identifier "ENODE_MAC202(4)" has an active group of "Group 1" that is identified in the FCF device pinning table entry 502a, and a backup group of "Group 2" that is identified in the FCF device pinning table entry 502b.

The method 1400 then proceeds to block 1410 where a server device port synchronization notification response is provided to the FSB that provided the server device port synchronization notification. In an embodiment of block 1410, and with reference to the FCoE backup path communication diagram 1500 of FIG. 15, the FCF device 206a may provide an FCF device response 1518 to the FSB 204b in response to the FCoE backup notification 1516 received from the FSB 204b. The FCF device response 1518 may indicate that the FCF device 206a has marked the FSB 204b as being included in the backup pinned group for the server device port on the server device 202. The FSB 204b may provide the server device port synchronization notification response 1520 to the FSB 204a to complete the FCoE backup path communication diagram 1500. The server device port synchronization notification response 1520 indicates to the FSB 204a that the FSB 204b will provide the backup path for the FCoE traffic, between the server device port of the server device 202 and the FCF device 206a, via the ICL provided by link 214e.

For example, and with reference to the FCF device pinned database 700a of FIG. 16A and the FCoE pinning system 200c of FIG. 2C, the FSB 204a may generate the FSB FCoE backup table 712. The FSB 204a may receive a server device port synchronization notification response through the FSB port 204a(3) from the FSB port 204b(3) that provides the link 214e. The server device port synchronization notification response may include the FCF device identifier of FCF device 206a, which indicates to the FSB 204a that the FSB port 204a(3) can handle backup FCoE traffic that originated from server port 202(1) and that is destined for the FCF device 206a. As indicated in FSB FCoE backup table entry 712a, the server device port identifier ("ENODE_MAC202 (1)") has an active group of "Group 1" with the FCF device 206a ("FCF_MAC206a") that is identified in the FSB pinning table entry 702a, and a backup group of "ICL" with the FCF device 206a ("FCF_MAC206a") that is identified in the FSB pinning table entry 702c through the FSB port 204a(3).

In another example and with reference to the FCF device pinned database 700b of FIG. 16B and the FCoE pinning system 200c of FIG. 2C, the FSB 204b may generate the FSB FCoE backup table 712. The FSB 204b may receive a server device port synchronization notification response through the FSB port 204b(3) from the FSB port 204a(3) that provides the link 214e that is an ICL. The server device port synchronization notification response may include the FCF device identifier of the FCF device 206a, which indicates to the FSB 204b that the FSB port 204b(3) can handle backup FCoE traffic that originated from server port 202(4) and that is destined for the FCF device 206a. As indicated in FSB FCoE backup table entry 712a, the server device port identifier "ENODE_MAC202(4)" has an active group of "Group 1" with the FCF device 206a ("FCF_MAC206a") that is identified in the FSB pinning table entry 702a, and a backup group of "ICL" with the FCF device 206a ("FCF_MAC206a") that is identified in the FSB pinning table entry 702c through the FSB port 204b(3).

In yet another example and with reference to the FCF device pinned database 700a of FIG. 17A and the FCoE pinning system 200d of FIG. 2D, the FSB 204a may generate the FSB FCoE backup table 712. The FSB 204a may receive a server device port synchronization notification response through the FSB port 204a(3) from the FSB port 204b(3) that provides the link 214e that is an ICL. The server device port synchronization notification response may include the FCF device identifier of FCF device 206a, which indicates to the FSB 204a that the FSB port 204a(3) can handle backup FCoE traffic that originated from server port 202(1) and that is destined for the FCF device 206a. As indicated in FSB FCoE backup table entry 712a, the server device port identifier "ENODE_MAC202(1)") has an active pinned group of "Group 1" with the FCF device 206a ("FCF_MAC206a"). The active pinned group of "Group 1" is identified in the FSB pinning table entry 702a. The FSB FCoE backup table entry 712a also indicates that the server device port identifier "ENODE_MAC202(1)" has a backup pinned group of "ICL" with the FCF device 206a ("FCF_MAC206a"). The backup pinned group "ICL" is identified in the FSB pinning table entry 702d through the FSB port 204a(3).

In yet another example and with reference to the FCF device pinned database 700b of FIG. 17B and the FCoE pinning system 200d of FIG. 2D, the FSB 204b may generate the FSB FCoE backup table 712. The FSB 204b may receive a server device port synchronization notification response through the FSB port 204b(3) from the FSB port 204a(3) that provides the link 214e that is an ICL. The server device port synchronization notification includes the FCF device identifier of FCF device 206b1, which indicates to the FSB 204b that the FSB port 204b(3) can handle backup FCoE traffic that originated from server port 202(4) and that is destined for the FCF device 206b. As indicated in FSB FCoE backup table entry 712a, the server device port identifier "ENODE_MAC202(4)" has an active pinned group of "Group 1" with the FCF device 206b ("FCF_MAC206b"). The active pinned group of "Group 1" is identified in the FSB pinning table entry 702a. The FSB FCoE backup table entry 712a also indicates that the server device port identifier "ENODE_MAC202(4)" has a backup pinned group of "ICL" with the FCF device 206b ("FCF_MAC206b"). The backup pinned group "ICL" is identified in the FSB pinning table entry 702d through the FSB port 204a(3).

In various embodiments, once fabric login is completed, FCoE traffic may now be provided through the FCF device port(s) and the FSB ports that are pinned for FCoE traffic. The FSB 204a and/or the FCF device 206a may reference the respective FSB pinned database 606 and the FCF device pinned database 406 to determine which ports on the FSB 204a and/or the FCF device 206a that are included in the aggregated interface and that are pinned for FCoE traffic, or otherwise support routing of FCoE traffic. If all of the links in the aggregated interface between the FSB 204a and the FCF device 206a become unavailable, the FSB 204a may determine whether an FSB FCoE backup table 712 exists, and whether there is a backup path for FCoE traffic communicated between the server device port and the FCF device 206a that used the aggregated interface that is now unavailable. The FSB 204a may determine there is a backup path through the ICL that is linked with the FSB 204a using the FSB FCoE backup table 712, and the FSB 204a may provide FCoE traffic through the ICL to the FSB 204b. The FSB 204b may then forward the traffic to the corresponding uplink between the FSB 204b and the FCF device 206a according to the FSB pinning table 702, and the FCF device 206a may utilize the FCF device FCoE backup table 512 to reference that FCF device pinning table 502 and recognize that the FCoE traffic from the server device port is being provided over a backup path.

In various embodiments, whenever there is a change in server device port status such as, for example, a login or a logout of a server device port, an addition or a removal of other FCF devices, and/or an addition or a removal of FSBs, the list of available server device ports may be synchronized again among the FSBs. In various embodiments, the FCF device may remove the backup pin group for a server device port when a server device port session has been cleared on the active pin group.

Thus, systems and methods have been described that provide for FCoE pinning, and providing an FCoE backup path that allows SANs to be reached by FSBs that are not included in the SAN, but that otherwise provide a connection with the SAN. The FCoE backup path may be created on ICLs between FSBs and, as such, may be formed without the need to perform a conventional SAN fabric login process. Furthermore, these backup paths may be automatically detected and configured. By synchronizing SAN reachability information and available Enodes on each FSB with FSBs that are directly connected through an ICL, each FSB may configure an FSB FCoE backup table that identifies a peer FSB as a backup path via the ICL. Similarly each FSB may pin ICLs for FCoE traffic such that, if FCoE traffic is received on the ICL, the FSB may forward the traffic to the FCF device. The FCF device may also maintain an FCF device FCoE backup table that identifies the pinned group on which backup FCoE traffic for a particular Enode may be received.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Fibre Channel over Ethernet (FCoE) pinning system, comprising:
    a Fibre Channel (FC) storage device;
    a first FCoE node;
    a second FCoE node;
    a first FCoE forwarder (FCF) device that is coupled to the FC storage device through a first FCF device port on the FCF device;
    a first FCoE Initialization Protocol (FIP) Snooping Bridge (FSB) that is coupled to a second FCF device port on the first FCF device through a first FSB port on the first FSB, and that is coupled to the first FCoE node through a second FSB port on the first FSB; and a second FSB that is coupled to a third FCF device port on the first FCF device through a third FSB port on the second FSB, that is coupled to the second FCoE node through a fourth FSB port on the second FSB, and that is coupled to the first FSB through an inter-chassis link (ICL) provided between the first FSB and the second FSB, wherein the second FSB is configured to:

receive, via the ICL, a first FCoE node synchronization notification that includes a first FCF device identifier for the first FCF device that indicates the first FCoE node is logged into the first FCF device through the first FSB;

associate a first FCoE node identifier included in the first FCoE node synchronization notification with the ICL;

provide an FCoE backup notification through the third FSB port to the first FCF device, wherein the FCoE backup notification is configured to indicate to the first FCF device that the second FSB provides a backup path for FCoE traffic between the first FCoE node and the first FCF device;

provide a second FCoE node synchronization notification to the first FSB, wherein the second FCoE node synchronization notification is configured to indicate that the second FSB will provide the backup path for the FCoE traffic between the first FCoE node and the first FCF device via the ICL; and provide FCoE traffic that originates from the first FCoE node and that is received via the ICL to the first FCF device.

2. The FCoE pinning system of claim 1, wherein the second FSB is further configured to:

generate, prior to the first FCoE node being logged in to the first FCF device a storage area network (SAN) reachability synchronization table by exchanging SAN reachability synchronization messages with the first FSB, wherein the SAN reachability synchronization table associates a first FSB identifier for the first FSB with a first FCF device identifier of the first FCF device.

3. The FCoE pinning system of claim 1, wherein the associating the first FCoE node identifier included in the first FCoE node synchronization notification with the ICL includes:

providing the association of the first FCoE node identifier with the ICL in an FSB pinning table included in the second FSB, wherein the FSB pinning table includes an association of the first FCF device identifier with the third FSB port during an FCoE pinning process, and wherein the associations in the FSB pinning table are pinned for FCoE traffic.

4. The FCoE pinning system of claim 1, wherein the second FSB is further configured to:

establish a login between the second FCoE node and the first FCF device;

provide, via the ICL to the first FSB and in response to the first FCF device identifier being included in a Storage Area Network (SAN) reachability synchronization table, a third FCoE node synchronization notification that includes the first FCF device identifier for the first FCF device and a second FCoE node identifier for the second FCoE node, wherein the third FCoE node synchronization notification indicates the second FCoE node is logged into the first FCF device through the second FSB;

receive, via the ICL, a fourth FCoE node synchronization notification that indicates that the first FSB will provide a backup path for the FCoE traffic between the second FCoE node and the first FCF device; and generate an FCoE backup table that identifies the ICL as a backup path for FCoE traffic from the second FCoE node to the first FCF device in the event that a link between the third FCF device port and the third FSB port fails.

5. The FCoE pinning system of claim 4, wherein the second FSB is further configured to:

determine that the link between the third FCF device port and the third FSB port has failed and, in response, provide FCoE traffic between the second FCoE node and the first FCF device via the ICL.

6. The FCoE pinning system of claim 1, further comprising:

a second FCF device coupled to a fifth FSB port on the first FSB through a fourth FCF device port on the second FCF device, and coupled to a sixth FSB port on the second FSB through a fifth FCF device port on the second FCF device, wherein the second FSB is configured to:

establish a login between the second FCoE node and the second FCF device;

provide, via the ICL to the first FSB, a third FCoE node synchronization notification that includes a second FCF device identifier for the second FCF device and a second FCoE node identifier for the second FCoE node, wherein the third FCoE node synchronization notification indicates that the second FCoE node is logged into the second FCF device through the second FSB;

receiving, via the ICL, a fourth FCoE node synchronization notification that indicates that the first FSB will provide a backup path for the FCoE traffic between the second FCoE node and the second FCF device; and generate an FCoE backup table that identifies the ICL as a backup path for FCoE traffic from the second FCoE node to the second FCF device in to the event that a link between the fifth FCF device port and the sixth FSB port fails.

7. The FCoE pinning system of claim 6, wherein the second FSB is further configured to:

determine that the link between the fifth FCF device port and the sixth FSB port has failed and, in response, provide FCoE traffic between the second FCoE node and the second FCF device via the ICL.

8. An Information Handling System (IHS), comprising:

a plurality of ports;

a processing system that is coupled to the plurality of ports; and a memory system that is coupled to the processing system and that includes instructions that, when executed by the processing system, cause the processing system to provide an Fibre Channel over Ethernet (FCoE) pinning engine that is configured to:

receive, via a first port of the plurality of ports that provides an inter-chassis link (ICL), a first FCoE node synchronization notification that includes a first FCF device identifier for a first FCF device that indicates a first FCoE node is logged into a first FCoE forwarder (FCF) device through a first FCoE Initialization Protocol (FIP) Snooping Bridge (FSB);

associate a first FCoE node identifier included in the first FCoE node synchronization notification with the ICL;

provide an FCoE backup notification through a second port of the plurality of ports to the first FCF device, wherein the FCoE backup notification is configured to indicate to the first FCF device that the second port provides a backup path for FCoE traffic between the first FCoE node and the first FCF device; and provide a second FCoE node synchronization notification to the first FSB, wherein the second FCoE node synchronization notification is configured to indicate that the ICL will provide the backup path for the FCoE traffic between the first FCoE node and the first FCF device via the ICL provide FCoE traffic that originates from the first FCoE node and that is received via the ICL to the first FCF device.

9. The IHS of claim 8, wherein the FCoE pinning engine is further configured to:

generate, prior to the first FCoE node being logged in to the first FCF device a storage area network (SAN) reachability synchronization table by exchanging SAN reachability synchronization messages with the first FSB, wherein the SAN reachability synchronization table associates a first FSB identifier for the first FSB with a first FCF device identifier of the first FCF device.

10. The IHS of claim 8, wherein the associating the first FCoE node identifier included in the first FCoE node synchronization notification with the ICL includes:

providing the association of the first FCoE node identifier with the ICL in an FSB pinning table, wherein the FSB pinning table includes an association of the first FCF device identifier with the second port during an FCoE pinning process, and wherein the associations in the FSB pinning table are pinned for FCoE traffic.

11. The IHS of claim 8, wherein the FCoE pinning engine is further configured to: establish a login between a second FCoE node and the first FCF device;

provide, via the ICL to the first FSB and in response to the first FCF device identifier being included in a Storage Area Network (SAN) reachability synchronization table, a third FCoE node synchronization notification that includes the first FCF device identifier for the first FCF device and a second FCoE node identifier for the second FCoE node, wherein the third FCoE node synchronization notification indicates the second FCoE node is logged into the first FCF device through the processing system;

receive, via the ICL, a fourth FCoE node synchronization notification that indicates that the first FSB will provide a backup path for the FCoE traffic between the second FCoE node and the first FCF device; and generate an FCoE backup table that identifies the ICL as a backup path for FCoE traffic from the second FCoE node to the first FCF device in the event that a link between the FCF device and the second port fails.

12. The IHS of claim 11, wherein the FCoE pinning engine is further configured to:

determine that the link between the FCF device port and the second port has failed and, in response, provide FCoE traffic between the second FCoE node and the first FCF device via the ICL.

13. A method of providing an FCoE backup path, comprising:

receiving, via a first port of a plurality of ports of a second FCoE Initialization Protocol (FIP) Snooping Bridge (FSB) that provides an inter-chassis link (ICL), a first FCoE node synchronization notification that includes a first FCF device identifier for a first FCF device that indicates a first FCoE node is logged into a first FCoE forwarder (FCF) device through a first FSB;

associating, by the second FSB, a first FCoE node identifier included in the first FCoE node synchronization notification with the ICL;

providing, by the second FSB, an FCoE backup notification through a second port of the plurality of ports to the first FCF device, wherein the FCoE backup notification is configured to indicate to the first FCF device that the second port provides a backup path for FCoE traffic between the first FCoE node and the first FCF device; and providing, by the second FSB, a second FCoE node synchronization notification to the first FSB, wherein the second FCoE node synchronization notification is configured to indicate that the ICL will provide the backup path for the FCoE traffic between the first FCoE node and the first FCF device via the ICL; and providing, by the second FSB, FCoE traffic that originates from the first FCoE node and that is received via the ICL to the first FCF device.

14. The method of claim 13, further comprising:

generating, by the second FSB and prior to the first FCoE node being logged in to the first FCF device a storage area network (SAN) reachability synchronization table by exchanging SAN reachability synchronization messages with the first FSB, wherein the SAN reachability synchronization table associates a first FSB identifier for the first FSB with a first FCF device identifier of the first FCF device.

15. The method of claim 13, wherein the associating the first FCoE node identifier included in the first FCoE node synchronization notification with the ICL includes:

providing, by the second FSB, the association of the first FCoE node identifier with the ICL in an FSB pinning table, wherein the FSB pinning table includes an association of the first FCF device identifier with the second port during an FCoE pinning process, and wherein the associations in the FSB pinning table are pinned for FCoE traffic.

16. The method of claim 13, further comprising:

establishing, by the second FSB, a login between a second FCoE node and the first FCF device;

providing, by the second FSB and via the ICL to the first FSB and in response to the first FCF device identifier being included in a Storage Area Network (SAN) reachability synchronization table, a third FCoE node synchronization notification that includes the first FCF device identifier for the first FCF device and a second FCoE node ide ntifier for the second FCoE node, wherein the third FCoE node synchronization notification indicates the second FCoE node is logged into the first FCF device through the second FSB;

receiving, by the second FSB via the ICL, a fourth FCoE node synchronization notification that indicates that the first FSB will provide a backup path for the FCoE traffic between the second FCoE node and the first FCF device; and generating, by the second FSB, an FCoE backup table that identifies the ICL as a backup path for FCoE traffic from the second FCoE node to the first FCF device in the event that a link between the FCF device and the second port fails.

17. The method of claim 16, further comprising:

determining, by the second FSB, that the link between the FCF device port and the second port has failed and, in response, providing FCoE traffic between the second FCoE node and the first FCF device via the ICL.

\* \* \* \* \*